United States Patent
Dahl et al.

(10) Patent No.: US 10,837,324 B2
(45) Date of Patent: Nov. 17, 2020

(54) FOUR-STROKE INTERNAL COMBUSTION ENGINE THERETO RELATED VEHICLE AND METHOD

(71) Applicant: Scania CV AB, Södertälje (SE)

(72) Inventors: Andreas Dahl, Nyköping (SE); Eric Olofsson, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/498,855

(22) PCT Filed: Mar. 27, 2018

(86) PCT No.: PCT/SE2018/050327
§ 371 (c)(1),
(2) Date: Sep. 27, 2019

(87) PCT Pub. No.: WO2018/182492
PCT Pub. Date: Oct. 4, 2018

(65) Prior Publication Data
US 2020/0049080 A1    Feb. 13, 2020

(30) Foreign Application Priority Data
Mar. 31, 2017 (SE) .................................... 1750392

(51) Int. Cl.
*F01L 1/06* (2006.01)
*F02D 13/02* (2006.01)
(Continued)

(52) U.S. Cl.
CPC .............. *F01L 1/06* (2013.01); *F01L 1/04* (2013.01); *F01L 13/0036* (2013.01); *F02D 13/0207* (2013.01); *F02D 13/0261* (2013.01)

(58) Field of Classification Search
CPC ...... F01L 1/047; F01L 1/06; F01L 1/46; F01L 9/025; F01L 13/0005; F01L 2013/001;
(Continued)

(56) References Cited

U.S. PATENT DOCUMENTS 4,664,070 A    5/1987 Meistrick et al.
5,507,254 A *  4/1996 Melchior ............... F16D 3/10
                                         123/90.17
(Continued)

FOREIGN PATENT DOCUMENTS

EP    1691041 A2    8/2006
EP    2184451 A1    5/2010
(Continued)

OTHER PUBLICATIONS

Scania CV AB, International Application No. PCT/SE2018/050327, International Search Report, dated Jun. 8, 2018.
(Continued)

*Primary Examiner* — Jorge L Leon, Jr.
(74) *Attorney, Agent, or Firm* — Moore & Van Allen PLLC; W. Kevin Ransom

(57) ABSTRACT

A four-stroke internal combustion engine is disclosed. A camshaft and a crankshaft if the engine are synchronised to rotate at a same rotational speed. A first linkage arrangement is configured to change the motion of an exhaust valve head. A second linkage arrangement is configured to change the motion of the intake valve head. A control unit is configured for controlling the first linkage arrangement to selectively prevent or reduce the motion of the exhaust valve head and for controlling the second linkage arrangement to selectively prevent or reduce the motion of the intake valve head.

19 Claims, 13 Drawing Sheets

(51) Int. Cl.
*F01L 1/04* (2006.01)
*F01L 13/00* (2006.01)

(58) Field of Classification Search
CPC ..... F01L 13/0036; F01L 13/06; F01L 13/085; F01L 2760/003; F02D 13/0207; F02D 13/04; F02D 13/06
USPC ......... 123/90.12, 90.13, 90.15, 90.16, 90.17, 123/481, 198 F
See application file for complete search history.

(56) References Cited

U.S. PATENT DOCUMENTS

| | | | |
|---|---|---|---|
| 5,996,550 | A | 12/1999 | Israel et al. |
| 6,237,551 | B1 | 5/2001 | Macor et al. |
| 6,244,257 | B1 | 6/2001 | Hu |
| 7,464,675 | B1 | 12/2008 | Schechter |
| 2001/0054403 | A1* | 12/2001 | Fujii ................... F01L 13/0036 123/90.15 |
| 2006/0021606 | A1* | 2/2006 | Bryant ................ F01L 13/0015 123/562 |
| 2006/0266030 | A1* | 11/2006 | Solomon ................... F01K 7/36 60/508 |
| 2007/0144467 | A1 | 6/2007 | Sailer et al. |
| 2010/0269806 | A1* | 10/2010 | Kreuter ................... F02B 41/06 123/70 R |
| 2012/0192818 | A1 | 8/2012 | Meldolesi et al. |
| 2013/0112160 | A1 | 5/2013 | Ohsawa |
| 2016/0146072 | A1 | 5/2016 | Ernest et al. |

FOREIGN PATENT DOCUMENTS

| | | |
|---|---|---|
| GB | 2402708 A | 12/2004 |
| WO | 9719260 A1 | 5/1997 |
| WO | 9834014 A1 | 8/1998 |
| WO | 2013081444 A1 | 6/2013 |
| WO | 2017213566 A1 | 12/2017 |

OTHER PUBLICATIONS

Scania CV AB, International Application No. PCT/SE2018/050327, Written Opinion, dated Jun. 8, 2018.
Scania CV AB, Swedish Application No. 1750392-1, Office Action, dated Nov. 23, 2017.
Scania CV AB, Swedish Application No. 1750392-1, Office Action, dated Jun. 11, 2018.
Scania CV AB, Swedish Application No. 1750995-1, Office Action, dated Jun. 8, 2018.
Scania CV AB, Swedish Application No. 1750995-1, Office Action, dated Jan. 31, 2019.
Scania CV AB, International Application No. PCT/SE2018/050327, International Preliminary Report on Patentability, dated Oct. 1, 2019.

* cited by examiner ical combustion engine. According to further aspects, the invention relates to a computer program for performing a method for controlling a four-stroke internal combustion engine, as well as a computer program product for performing a method for controlling a four-stroke internal combustion engine.

FOUR-STROKE INTERNAL COMBUSTION ENGINE THERETO RELATED VEHICLE AND METHOD

CROSS-REFERENCE TO RELATED APPLICATIONS

This application is a national stage application (filed under 35 § U.S.C. 371) of PCT/SE2018/050327, filed Mar. 27, 2018 of the same title, which, in turn, claims priority to Swedish Application No. 1750392-1 filed Mar. 31, 2017; the contents of each of which are hereby incorporated by reference.

FIELD OF THE INVENTION

The invention relates to a four-stroke internal combustion engine. The invention further relates to a vehicle comprising a four-stroke internal combustion engine. Also, the invention relates to a method for controlling a four-stroke internal combustion engine. According to further aspects, the invention relates to a computer program for performing a method for controlling a four-stroke internal combustion engine, as well as a computer program product for performing a method for controlling a four-stroke internal combustion engine.

BACKGROUND OF THE INVENTION

A piston of a four-stroke internal combustion engine, ICE, performs four-strokes, an intake stroke, a compression stroke, a power stroke, and an exhaust stroke in a cylinder of the ICE. During ordinary operation of the ICE, air is drawn into the cylinder during the intake stroke, the air is compressed during the compression stroke. A certain amount of energy is added as fuel is injected into the cylinder when the piston is around its top dead centre, TDC. The fuel combusts and expands during the power stroke. During the exhaust stroke exhaust gases are ejected from the cylinder. Thus, a crankshaft of the ICE is driven by the piston or pistons of the ICE.

Some ICE:s may be operated in alternative modes such as a mode in which a piston brakes a rotation of the crankshaft. In this manner an internal load may be put on the ICE. For instance, such an internal load may be utilized for reducing a rotational speed of the crankshaft, or for producing hot exhaust gases from other cylinders of the relevant ICE, which in turn may heat up a catalytic reduction system for exhaust gases of the ICE. Some ICE:s may be operated in a mode in which no air passes through a cylinder of the ICE. In this manner a cylinder of an ICE may be shut off during periods when the ICE is subjected to low loads. Since no air passes through the cylinder, a catalytic reduction system of the ICE is not cooled down.

Accordingly, a modern four-stroke ICE benefits from being able to be operated not only in an ordinary engine running mode but also in other modes.

SUMMARY OF THE INVENTION

It is an object of the invention to provide a four-stroke internal combustion engine, ICE, that permits operation in different modes.

According to an aspect of the invention, the object is achieved by a four-stroke internal combustion engine comprising at least one cylinder arrangement, a crankshaft, and at least one camshaft. The at least one cylinder arrangement forms a combustion chamber and comprises a cylinder bore, a piston arranged to reciprocate in the cylinder bore, a connecting rod connecting the piston with the crankshaft, an exhaust arrangement for outflow of exhaust gas from the cylinder bore, and an intake arrangement for intake of fresh gas into the cylinder bore. The piston performs four strokes in the cylinder bore, corresponding to an intake stroke, a compression stroke, a power stroke, and an exhaust stroke. The exhaust arrangement comprises an exhaust valve and an exhaust opening. The exhaust valve comprises an exhaust valve head configured to seal against an exhaust valve seat of the exhaust opening. The intake arrangement comprises an intake valve and an intake opening. The intake valve comprises an intake valve head configured to seal against an intake valve seat of the intake opening. The at last one camshaft, comprises a first lobe configured to cause a motion of the exhaust valve head for opening and closing the exhaust opening. The at least one camshaft, comprises a second lobe configured to cause a motion of the intake valve head for opening and closing the intake opening. The at least one camshaft, is synchronized with the crankshaft to rotate at a same rotational speed as the crankshaft. The exhaust arrangement comprises a first linkage arrangement configured to change the motion of the exhaust valve head caused by the first lobe, and the intake arrangement comprises a second linkage arrangement configured to change the motion of the intake valve head caused by the second lobe. The four-stroke internal combustion engine comprises a control unit configured for controlling the first linkage arrangement to selectively prevent the motion of the exhaust valve head and configured for controlling the second linkage arrangement to selectively prevent the motion of the intake valve head. The control unit is further configured for controlling the first linkage arrangement to selectively reduce the motion of the exhaust valve head, and/or configured for controlling the second linkage arrangement to selectively reduce the motion of the intake valve head.

Since the at least one camshaft is synchronized with the crankshaft to rotate at a same rotational speed as the crankshaft, the at least one camshaft together with the first and second lobes will perform two revolutions while the crankshaft rotates the two revolutions required for the piston to perform its four-strokes, as opposed to a camshaft performing only one revolution while the crankshaft rotates its two revolutions. Since the exhaust arrangement comprises a first linkage arrangement configured to change the motion of the exhaust valve head caused by the first lobe, and the intake arrangement comprises a second linkage arrangement configured to change the motion of the intake valve head caused by the second lobe, movements of the exhaust valve head and the intake valve head can be manipulated. Since the four-stroke internal combustion engine comprises a control unit configured for controlling the first linkage arrangement to selectively prevent the motion of the exhaust valve head and configured for controlling the second linkage arrangement to selectively prevent the motion of the intake valve head, particular movements of the exhaust valve head and/or the intake valve head otherwise caused by the first and second lobes can be prevented to achieve particular opening and closing patterns of the exhaust valve head and the intake valve head for the provision of different modes of operation of the internal combustion engine. Since the control unit is further configured for controlling the first linkage arrangement to selectively reduce the motion of the exhaust valve head, and/or configured for controlling the second linkage arrangement to selectively reduce the motion of the intake valve head, reduced movements of the exhaust valve head and/or the intake valve head can be caused by the first and second lobes for different modes of operation of the internal combustion engine. Accordingly, the four-stroke internal combustion engine is easily adaptable to different modes of operation. As a result, the above mentioned object is achieved.

More specifically, the provision of the camshaft rotating at the same rotational speed as the crankshaft, provides for the first lobe to move the exhaust valve head not only during the exhaust stroke but also during the compression stroke. Similarly, this provides for the second lobe to move the intake valve head not only during the intake stroke but also during the power stroke.

Flexibility related to the opening of the exhaust and intake valve heads is provided by the first and second linkage arrangements. Thus, in order to achieve a particular mode of operation of the ICE, the control unit will control:

the first linkage arrangement to selectively prevent the exhaust valve head from opening during the compression stroke and/or the exhaust stroke, and/or the second linkage arrangement to selectively prevent the intake valve head from opening during the intake stroke and/or the power stroke, and/or the first linkage arrangement to selectively reduce the motion of the exhaust valve head during the compression stroke and/or the exhaust stroke, and/or the second linkage arrangement to selectively reduce the motion of the intake valve head during the intake stroke and/or the power stroke.

Accordingly, an ICE is provided which is flexibly adaptable to a number of different operational modes, such e.g. an ordinary engine running mode, in which the piston drives the crankshaft and different engine braking modes, in which the piston brakes the crankshaft.

It has been realized by the inventors that linkage arrangements may be utilized to selectively prevent a motion of an exhaust valve head and of an intake valve head in an ICE having at least one camshaft rotating at a same rotational speed as a crankshaft of the ICE, in order to achieve different operational modes of the ICE by opening and not opening exhaust and intake valve heads according to different patterns during two complete revolutions of the at last one camshaft and the crankshaft.

It has further been realized by the inventors that the linkage arrangements may be utilized for selectively reducing the motion of the exhaust valve head and/or for the intake valve head in the ICE having at least one camshaft rotating at the same rotational speed as the crankshaft of the ICE, in order to achieve different operational modes of the ICE by partially opening the exhaust valve head and/or the intake valve head according to different patterns during two complete revolutions of the at least one camshaft and the crankshaft.

The four-stroke ICE may comprise more than one cylinder arrangement, each cylinder arrangement forming a combustion chamber and comprising a cylinder bore, a piston arranged to reciprocate in the cylinder bore, a connecting rod connecting the piston with the crankshaft, an exhaust arrangement for outflow of exhaust gas from the cylinder bore, and an intake arrangement for intake of fresh gas into the cylinder bore.

The combustion chamber is arranged inside the cylinder arrangement, above the piston. Intake air may enter the combustion chamber through the intake arrangement of the cylinder arrangement during the intake stroke of the piston, e.g. during an ordinary engine running mode of the ICE. The intake air may be compressed by a turbocharger. The internal combustion engine may be e.g. a compression ignition CI engine, such as a Diesel type engine, or a spark ignition engine, such as an Otto type engine and comprises in the latter case a sparkplug or similar device in the cylinder arrangement. Fuel may be injected into the combustion chamber during part of the compression stroke or intake stroke of the piston, or may be entrained with the intake air, e.g. during an ordinary engine running mode of the ICE. The fuel may ignite near the TDC between the compression stroke and the power stroke of the piston, e.g. during an ordinary engine running mode of the ICE. The camshaft being synchronized with the crankshaft to rotate at a same rotational speed as the crankshaft means that the camshaft and the crankshaft have the same angular velocity, $\omega$.

The reduction of the motion of the exhaust valve head and the intake valve head, respectively, may be a reduction in amplitude and/or a reduction in time. The reduction of the motion of the exhaust valve head and the intake valve head, respectively, may lead to the relevant valve head being open during an initial portion of a stroke, or during a middle portion of a stroke, or during a final portion of a stroke.

According to embodiments, the at least one camshaft, may comprise a third lobe configured to cause a motion of the exhaust valve head for opening and closing the exhaust opening, and the at least one camshaft, may comprise a fourth lobe configured to cause a motion of the intake valve head for opening and closing the intake opening. The control unit may be configured for controlling:

the first linkage arrangement to selectively prevent the motion of the exhaust valve head otherwise caused by the third lobe, the second linkage arrangement to selectively prevent the motion of the intake valve head otherwise caused by the fourth lobe, the first linkage arrangement to selectively reduce the motion of the exhaust valve head caused by the third lobe, and/or the second linkage arrangement to selectively reduce the motion of the intake valve head caused by the fourth lobe.

For instance, the third lobe may move the exhaust valve head during the intake stroke and/or during the power stroke, unless the first linkage arrangement prevents the motion of the exhaust valve head. Similarly, the fourth lobe may move the intake valve head during the compression stroke and/or during the exhaust stroke, unless the second linkage arrangement prevents the motion of the intake valve head. The third lobe may cause a reduced motion of the exhaust valve head during the intake stroke and/or during the power stroke when the first linkage arrangement is controlled to reduce the motion of the exhaust valve head caused by the third lobe. Similarly, the fourth lobe may cause a reduced motion of the intake valve head during the compression stroke and/or during the exhaust stroke when the second linkage arrangement is controlled to reduce the motion of the intake valve head caused by the fourth lobe.

Accordingly, an ICE is provided which is flexibly adaptable to a number of different operational modes, such e.g. different engine running modes, in which the piston drives the crankshaft and different engine braking modes, in which the piston brakes the crankshaft.

According to a further aspect of the invention, there is provided a vehicle comprising a four-stroke internal combustion engine according to any one of aspects and/or embodiments discussed herein.

According to a further aspect of the invention, there is provided a method for controlling a four-stroke internal combustion engine, the four-stroke internal combustion engine comprising at least one cylinder arrangement, a crankshaft, and at least one camshaft. The at least one cylinder arrangement forms a combustion chamber and comprises a cylinder bore, a piston arranged to reciprocate in the cylinder bore, a connecting rod connecting the piston with the crankshaft, an exhaust arrangement for outflow of exhaust gas from the cylinder bore, and an intake arrangement for intake of fresh gas into the cylinder bore. The piston performs four strokes in the cylinder bore, corresponding to an intake stroke, a compression stroke, a power stroke, and an exhaust stroke. The exhaust arrangement comprises an exhaust valve and an exhaust opening, the exhaust valve comprising an exhaust valve head configured to seal against an exhaust valve seat of the exhaust opening. The intake arrangement comprises an intake valve and an intake opening, the intake valve comprising an intake valve head configured to seal against an intake valve seat of the intake opening. The at least one camshaft, comprises a first lobe configured to cause a motion of the exhaust valve head for opening and closing the exhaust opening, and the at least one camshaft, comprises a second lobe configured to cause a motion of the intake valve head for opening and closing the intake opening. The method comprises steps of:

- rotating the at least one camshaft, at a same rotational speed as the crankshaft,
- changing the motion of the exhaust valve head caused by the first lobe by means of a first linkage arrangement comprised in the exhaust arrangement,
- changing the motion of the intake valve head caused by the second lobe by means of a second linkage arrangement comprised in the intake arrangement, wherein the step of changing the motion of the exhaust valve head caused by the first lobe comprises steps of:
- selectively preventing the motion of the exhaust valve head caused by the first lobe, and
- selectively reducing the motion of the exhaust valve head caused by the first lobe, and wherein the step of changing the motion of the intake valve head caused by the second lobe comprises steps of:
- selectively preventing the motion of the intake valve head caused by the second lobe, and
- selectively reducing the motion of the intake valve head caused by the second lobe.

According to a further aspect of the invention, there is provided a computer program comprising instructions which, when the program is executed by a computer, cause the computer to carry out the method according to any one of—aspects and/or embodiments discussed herein.

According to a further aspect of the invention, there is provided a computer-readable storage medium comprising instructions which, when executed by a computer, cause the computer to carry out the method according to any one of aspects and/or embodiments discussed herein.

Further features of, and advantages with, the invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION OF THE INVENTION

Aspects of the invention will now be described more fully. Like numbers refer to like elements throughout. Well-known functions or constructions will not necessarily be described in detail for brevity and/or clarity.

Figure 1:
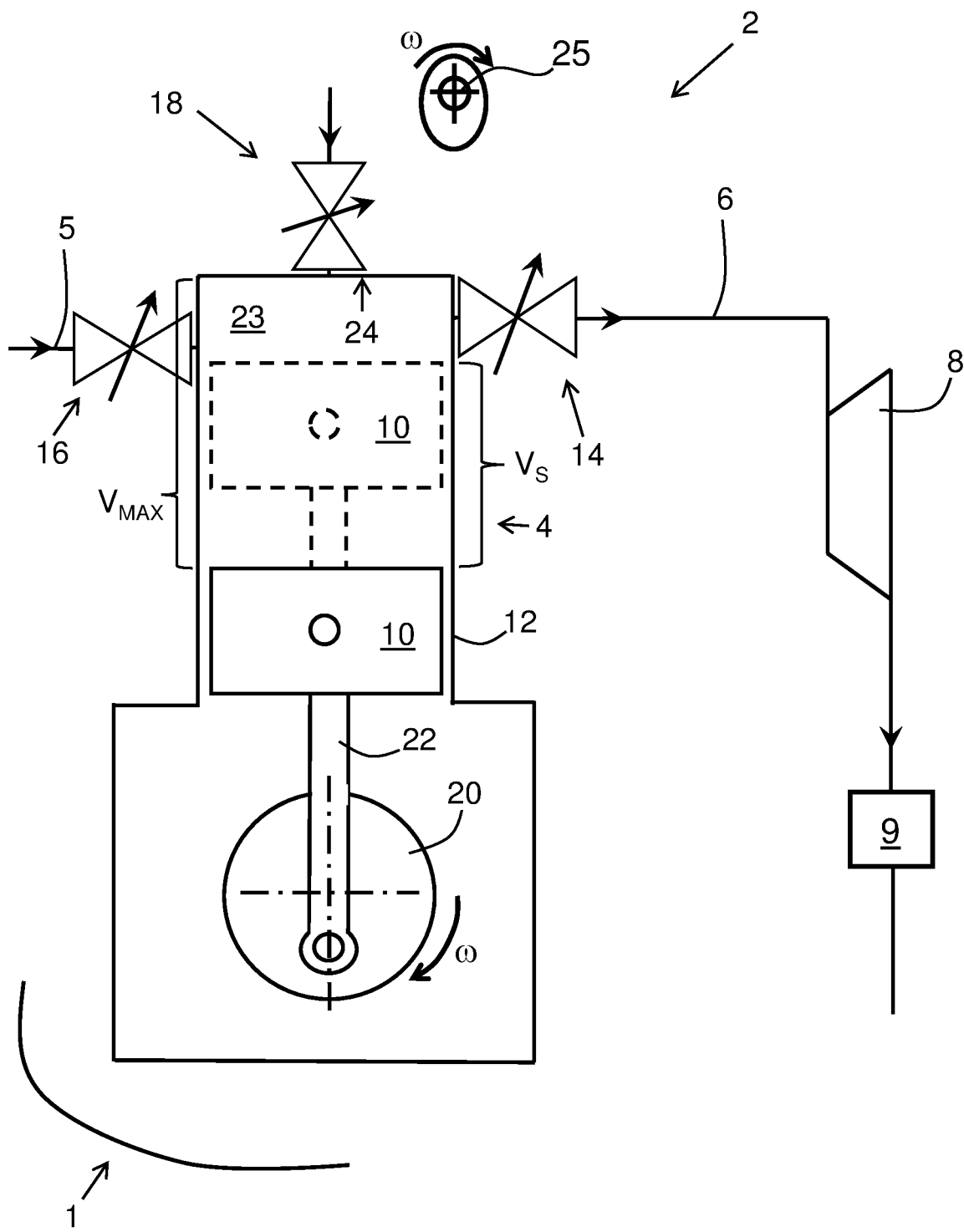
FIG. 1 schematically illustrates a four-stroke internal combustion engine, ICE, according to embodiments, FIG. 2 schematically illustrates a cylinder arrangement of the ICE of FIG. 1, FIG. 3 schematically illustrates an ICE according to embodiments.

FIG. 1 schematically illustrates a four-stroke internal combustion engine, ICE, 2 according to embodiments. The ICE 2 comprises at least one cylinder arrangement 4, a crankshaft 20, and at least one camshaft 25. FIG. 1 also schematically illustrates a vehicle 1 comprising an ICE 2 according to any one of aspects and/or embodiments disclosed herein. The vehicle 1 may be e.g. a heavy vehicle such as a truck or a bus. The vehicle 1 comprises a four-stroke ICE 2 according to any one of aspects and/or embodiments discussed herein, i.e. not only the ICE 2 of the embodiments of FIG. 1, but alternatively according to the other embodiments discussed herein. Moreover, the ICE 2 of the vehicle 1 may be controlled according to a method according to aspects and/or embodiments discussed herein.

The at least one cylinder arrangement 4 comprises a piston 10, a cylinder bore 12, an exhaust arrangement 14, an intake arrangement 16, and a fuel injection arrangement 18, and/or an ignition device. The piston 10 is arranged to reciprocate in the cylinder bore 12. The piston 10 performs four strokes in the cylinder bore 12 during two full revolutions of the crankshaft 20. During an ordinary engine running mode when fuel is combusted in the ICE 2, the four strokes correspond to an intake stroke, a compression stroke, a power stroke, and an exhaust stroke. In accordance with the invention, other tasks than fresh gas intake, compression, combustion, and exhaust gas ejection may be performed during the respective strokes. However, for the sake of clarity, herein the strokes will be named according to the common terminology, i.e. intake stroke, compression stroke, power stroke, and exhaust stroke. The at least one camshaft 25 rotates at a same rotational speed ω as the crankshaft 20.

In FIG. 1 the piston 10 is illustrated with continuous lines at its bottom dead centre, BDC, and with dashed lines at its top dead centre, TDC. The cylinder arrangement 4 has a maximum volume, $V_{MAX}$, between the BDC of the piston 10 and an upper inner delimiting surface 24 of a combustion chamber 23. The combustion chamber 23 is formed above the piston 10 inside the cylinder arrangement 4. A connecting rod 22 connects the piston 10 with the crankshaft 20. The ICE 2 may comprise an exhaust conduit 6 and at least one turbine 8 connected to the exhaust arrangement 14. An intake conduit 5, for conducting e.g. air, is connected to the intake arrangement 16. The turbine 8 may be connected to a compressor (not shown), forming a turbocharger. The compressor compresses air lead via the intake conduit 5 to the intake arrangement 16 and the combustion chamber 23. Exhaust gases from the ICE 2 may be cleaned in a cleaning system 9 (after-treatment system), such as e.g. a catalytic reduction system.

The cylinder arrangement 4 has a total swept volume, $V_S$, in the cylinder bore 12 between the BDC and the TDC. The cylinder arrangement 4 has a compression ratio, $\varepsilon$. $V_{MAX}$ may be expressed as: $V_{MAX}=V_S*(\varepsilon/(\varepsilon-1))$.

The exhaust arrangement 14 comprises an exhaust valve and an exhaust opening and the intake arrangement 16 comprises an intake valve and an intake opening, as will be discussed below, inter alia with reference to FIG. 2. The exhaust arrangement 14 is arranged for outflow of exhaust gases from the cylinder bore 12. The exhaust arrangement 14 is configured to open and close the exhaust opening during an exhaust sequence of the piston reciprocation. According to some embodiments, the exhaust sequence may start before the piston 10 reaches its BDC during the power stroke and may end around the TDC of the piston between the exhaust stroke and the intake stroke. The intake arrangement 16 is configured for intake of fresh gas into the cylinder bore 12. The intake arrangement 16 is configured to open and close the intake opening during an intake sequence of the piston reciprocation. According to some embodiments, the intake sequence may start around the TDC of the piston 10 between the exhaust stroke and of the intake stroke and may end around the BDC of the piston 10 between the intake stroke and the compression stroke.

According to some embodiments, the cylinder arrangement 4 may have a total swept volume, $V_S$, in the cylinder bore 12 between the BDC and TDC of the piston 10, wherein $0.3<V_S<4$ litres. Mentioned purely as an example, in the lower range of Vs, the cylinder arrangement 4 may form part of an internal combustion engine for a passenger car, and in the middle and higher range of Vs, the cylinder arrangement 4 may form part of an internal combustion engine for a heavy load vehicle such as e.g. a truck, a bus, or a construction vehicle. Also in the higher range of Vs, the cylinder arrangement 4 may form part of an internal combustion engine for e.g. a generator set (genset), for marine use, or for rail bound (train) use.

Figure 2:
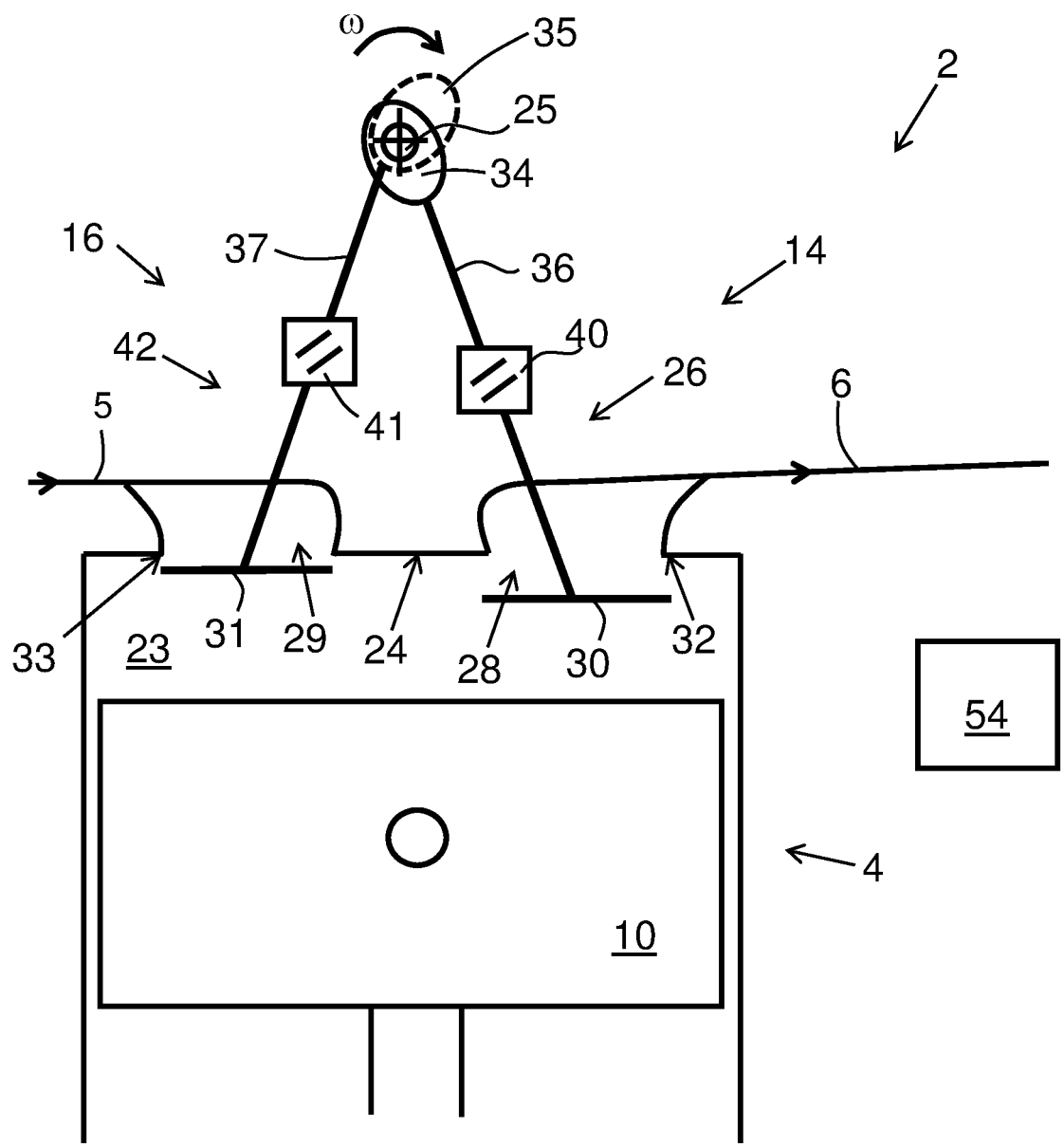

FIG. 2 schematically illustrates the at least one cylinder arrangement 4 of the ICE 2 of FIG. 1. In particular, the exhaust arrangement 14 and the intake arrangement 16 are shown in more detail.

The exhaust arrangement 14 comprises an exhaust valve 26 and an exhaust opening 28. The exhaust gases flow out from the combustion chamber 23 through the exhaust opening 28 when the exhaust valve 26 is open. The exhaust valve 26 comprises an exhaust valve head 30 configured to seal against an exhaust valve seat 32 extending around the exhaust opening 28. The exhaust valve seat 32 may be provided in the cylinder arrangement 4 e.g. at the upper inner delimiting surface 24 of the combustion chamber 23.

The intake arrangement 16 comprises an intake valve 42 and an intake opening 29. Fresh gas enters the combustion chamber 23 through the intake opening 29 when the intake valve 42 is open. The intake valve 42 comprises an intake valve head 31 configured to seal against an intake valve seat 33 extending around the intake opening 29. The intake valve seat 33 may be provided in the cylinder arrangement 4 e.g. at the upper inner delimiting surface 24 of the combustion chamber 23.

The camshaft 25 is arranged for controlling movement of the exhaust valve 26, and opening and closing of the exhaust valve 26. Namely, the camshaft 25 comprises a first lobe 34 configured to abut against the exhaust valve 26. Thus, at least a portion of the exhaust valve 26 will follow a contour of the first lobe 34. Accordingly, the first lobe 34 is configured to cause a motion of the exhaust valve head 30 for opening and closing the exhaust opening 28. Put differently, the first lobe 34 provides an input to the valve head 30, i.e. the first lobe 34 forms a cam, which is followed by an end portion 36 of the exhaust valve 26. The first lobe 34 is eccentrically arranged on the camshaft 25. The end portion 36 of the exhaust valve 26 abuts against the first lobe 34. As the camshaft 25 rotates, the end portion 36 of the exhaust valve 26 follows the first lobe 34, causing the motion of the exhaust valve head 30. The exhaust valve 26 may be biased towards its closed position, as known in the art, e.g. by means of a spring. The exhaust arrangement 14 comprises a first linkage arrangement 40 configured to change the motion of the exhaust valve head 30 caused by the first lobe 34.

The camshaft 25 is arranged for controlling movement of the intake valve 42, and opening and closing of the intake valve 42. Namely, the camshaft 25 comprises a second lobe 35, shown with broken lines in FIG. 2, configured to abut against the intake valve 42. Thus, at least a portion of the intake valve 42 will follow a contour of the second lobe 35. Accordingly, the second lobe 35 is configured to cause a motion of the intake valve head 31 for opening and closing the intake opening 29. Put differently, the second lobe 35 provides an input to the intake valve head 31, i.e. the second lobe 35 forms a cam, which is followed by an end portion 37 of the intake valve 42. The second lobe 35 is eccentrically arranged on the camshaft 25. The end portion 37 of the intake valve 42 abuts against the second lobe 35. As the camshaft 25 rotates, the end portion 37 of the intake valve 42 follows the second lobe 35, causing the motion of the intake valve head 31. The intake valve 42 may be biased towards its closed position, as known in the art, e.g. by means of a spring. The intake arrangement 16 comprises a second linkage arrangement 41 configured to change the motion of the intake valve head 31 caused by the second lobe 35.

The camshaft 25 is synchronized with the crankshaft 20 to rotate at a same rotational speed as the crankshaft 20, i.e. the camshaft 25 has the same angular velocity, $\omega$, as the crankshaft 20.

The ICE 2 comprises a control unit 54 configured for controlling the first linkage arrangement 40 to selectively prevent the motion of the exhaust valve head 30. The control unit 54 is also configured for controlling the second linkage arrangement 41 to selectively prevent the motion of the intake valve head 31. Moreover, the control unit 54 is further configured for controlling the first linkage arrangement 40 to selectively reduce the motion of the exhaust valve head 30, and/or configured for controlling the second linkage arrangement 41 to selectively reduce the motion of the intake valve head 31. Thus, the control unit 54 of the ICE 2 is configured to control the first and second linkage arrangements 40, 41 to achieve a number of different patterns for fully or partially opening and closing of the exhaust valve opening 28 and the intake valve opening 29.

The change of the motion of the exhaust valve head 30 caused by the first lobe 34, and of the intake valve head 31 caused by the second lobe 35, respectively, encompass the above mentioned preventing of the motion and the exhaust valve head 30 and of the intake valve head 31, as well as the above mentioned reduction of the motion of the exhaust valve head 30, and/or of the intake valve head 31.

Figure 3:
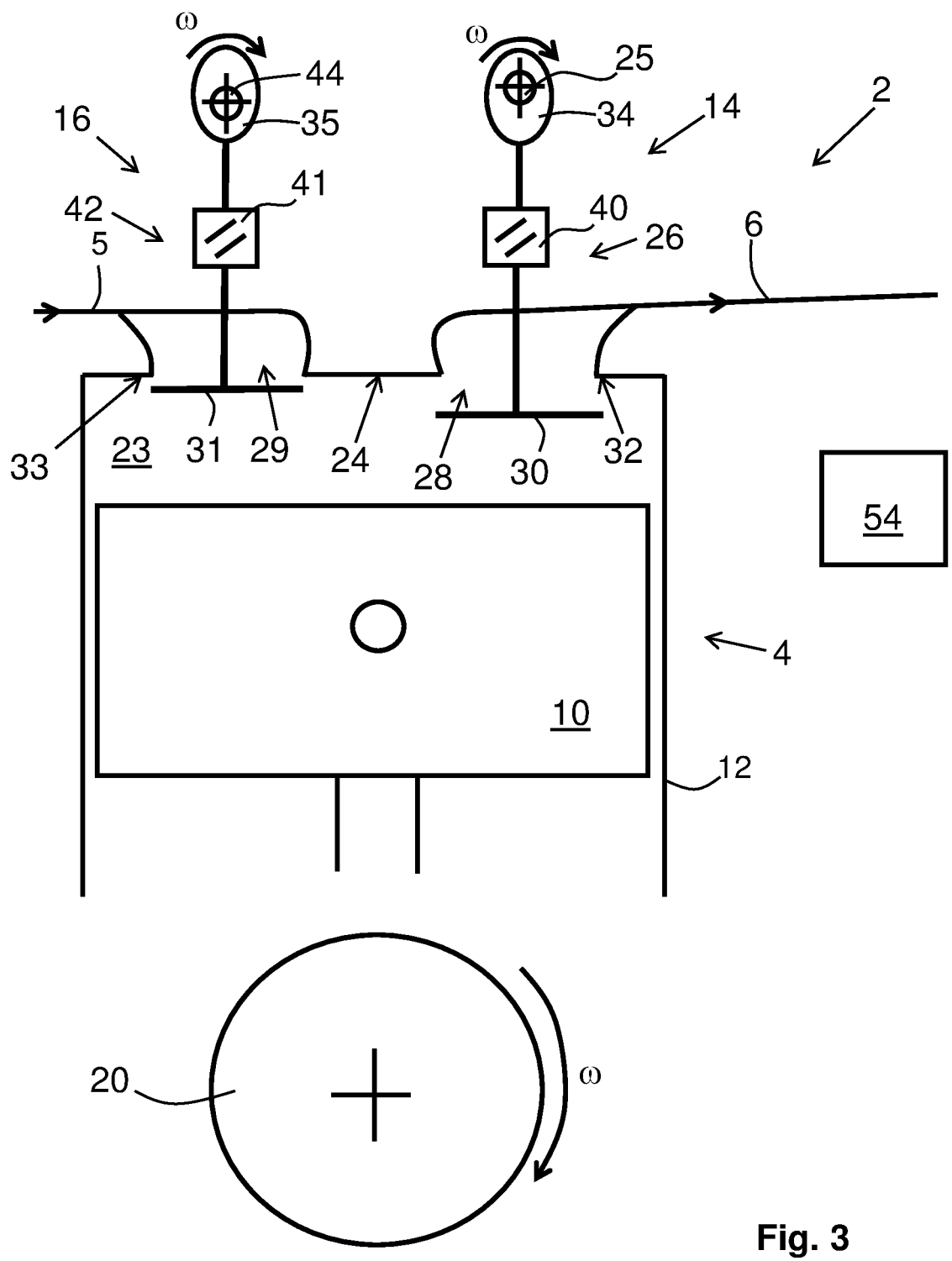

FIG. 3 schematically illustrates a four-stroke internal combustion engine, ICE, 2 according to embodiments. These embodiments resemble in much the embodiments of FIGS. 1 and 2. In the following the main differences with the embodiments of FIGS. 1 and 2 will be discussed.

Again, the ICE 2 comprises at least one cylinder arrangement 4 and a crankshaft 20, and the at least one cylinder arrangement 4 comprises a piston 10, a cylinder bore 12, an exhaust arrangement 14, an intake arrangement 16, and a fuel injection arrangement (not shown), and/or an ignition device. The piston 10 is arranged to reciprocate in the cylinder bore 12. Further, the ICE 2 comprises a first camshaft 25 and a second camshaft 44. The first camshaft 25 comprises the first lobe 34, and the second camshaft 44 comprises the second lobe 35.

The first camshaft 25 is arranged for controlling movement of the exhaust valve 26, including opening and closing of the exhaust valve 26. The control is achieved in the same manner as in the previously discussed embodiments. Again, the exhaust arrangement 14 comprises a first linkage arrangement 40 configured to change the motion of the exhaust valve head 30 caused by the first lobe 34. Again, the first linkage arrangement 40 is controlled by the control unit 54 of the ICE 2.

The second camshaft 44 is arranged for controlling movement of the intake valve 42, including opening and closing of the intake valve 42. The control is achieved in the same manner as in the previously discussed embodiments. Again, the intake arrangement 16 comprises a second linkage arrangement 41 configured to change the motion of the intake valve head 31 caused by the second lobe 35. Again, the second linkage arrangement 41 is controlled by the control unit 54 of the ICE 2.

Both the first and second camshafts 25, 44 are synchronized with the crankshaft 20 to rotate at a same rotational speed as the crankshaft 20, i.e. the first and second camshafts 25, 44 have the same angular velocity, co, as the crankshaft 20. Again, the control unit 54 is configured for controlling the first linkage arrangement 40 to selectively prevent the motion of the exhaust valve head 30, and the control unit 54 is configured for controlling the second linkage arrangement 41 to selectively prevent the motion of the intake valve head 31. Again, the control unit 54 is further configured for controlling the first linkage arrangement 40 to selectively reduce the motion of the exhaust valve head 30, and/or configured for controlling the second linkage arrangement 41 to selectively reduce the motion of the intake valve head 31. Thus, the control unit 54 of the ICE 2 is configured to control the first and second linkage arrangements 40, 41 to achieve a number of different patterns for fully or partially opening and closing of the exhaust valve opening 28 and the intake valve opening 29.

In the following, with reference to FIGS. 4-5, various embodiments of linkage arrangements for an exhaust arrangement 14 or an intake arrangement 16 of an ICE 2 according to embodiments will be discussed. In the discussion reference will be made to the first linkage arrangement 40 utilized in an exhaust arrangement 14. However, it is understood that the same type of linkage arrangement may be utilized in an intake arrangement 16. The linkage arrangements may be used in connection with an ICE 2 comprising one camshaft 25, as well as an ICE 2 comprising a first camshaft 25 and a second camshaft 44.

Figure 4:
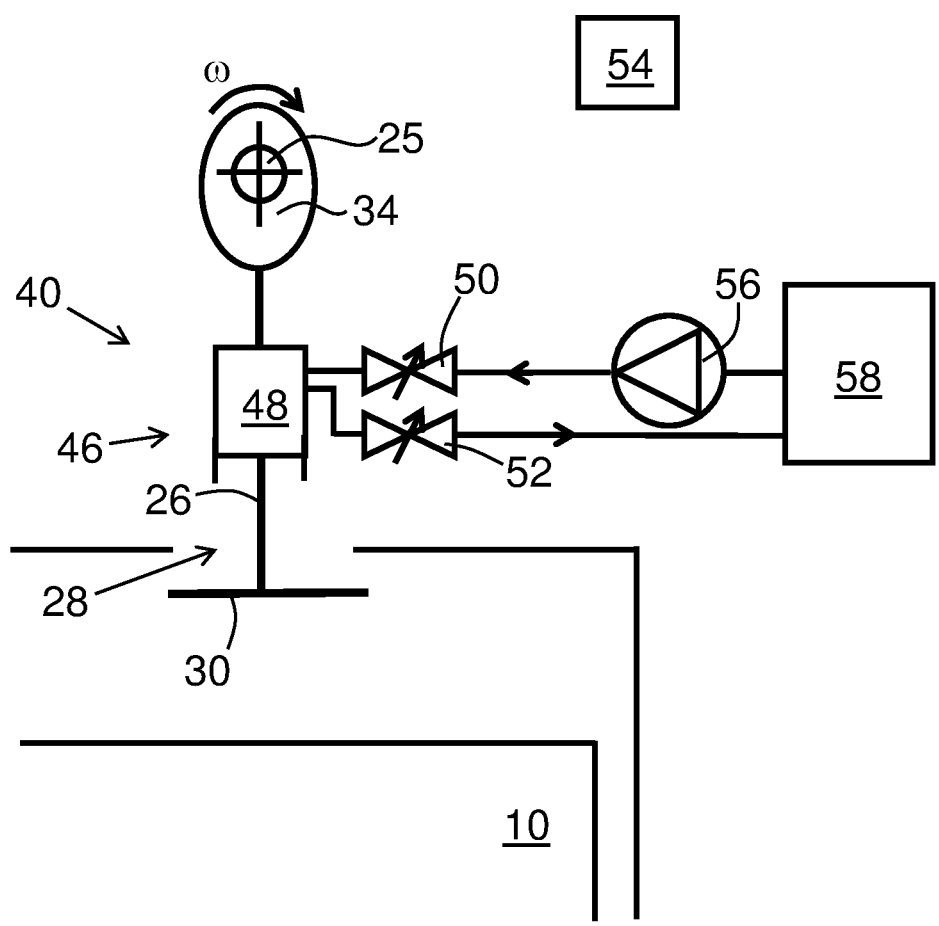
FIG. 4 illustrates schematically embodiments of a linkage arrangement comprising a hydraulic linkage, FIG. 5 schematically illustrates alternative embodiments of a linkage arrangement comprising a hydraulic linkage, FIG. 6 schematically illustrates some of different possible opening and closing patterns of exhaust and intake valve openings.

FIG. 4 illustrates schematically embodiments of a first linkage arrangement 40 comprising a hydraulic linkage 46 arranged between the camshaft 25 and the exhaust valve head 30. The hydraulic linkage 46, in a first state, is configured to transfer an input of the first lobe 34 to the exhaust valve head 30 to cause the motion of the exhaust valve head 30. The hydraulic linkage 46, in a second state, is configured to prevent the motion of the exhaust valve head 30. The hydraulic linkage 46, in a third state, is configured to reduce the motion of the exhaust valve head 30. Since hydraulics are well developed and numerous constructional elements are known in the field of hydraulics, a hydraulic linkage 46 provides basis for a responsive and controllable first linkage arrangement 40.

The hydraulic linkage 46 comprises a hydraulic cylinder 48 forming part of a valve stem of the exhaust valve 26. As the camshaft 25 rotates at the same speed as the crankshaft of the ICE, the hydraulic cylinder 48 is alternately filled with, and at least partially emptied from, hydraulic liquid. An inlet valve 50 and an outlet valve 52 are controlled by a control unit 54 such that the hydraulic cylinder 48 is filled with hydraulic liquid prior to or during e.g. an exhaust stroke of the piston 10, and remains filled during the stroke. Thus, the hydraulic linkage 46 is in the first state. The inlet valve 50 and the outlet valve 52 are controlled by the control unit 54 such that the outlet valve 52 is emptied from hydraulic liquid prior to and during e.g. a compression stroke of the piston 10. Thus, the hydraulic linkage 46 is in the second state. The inlet valve 50 and the outlet valve 52 are controlled by the control unit 54 such that the outlet valve 52 is filed with, and partially emptied from, hydraulic liquid during a stroke of the piston 10 to achieve the reduced motion of the exhaust valve head 30. Thus, the hydraulic linkage 46 is in the third state.

A pump 56 may be fluidly connected to the inlet valve 50 and may pressurize the hydraulic liquid such that when the inlet valve 50 is open, the hydraulic cylinder 48 is filled with hydraulic liquid. The inlet valve 50 is fluidly connected to the hydraulic cylinder 48. A tank 58 for the hydraulic liquid may be provided. The outlet valve 52 may be fluidly connected to the hydraulic cylinder 48 and the tank 58 for leading hydraulic liquid from the hydraulic cylinder 48 to the tank 58.

The hydraulic liquid may be hydraulic oil. The fuel of the ICE may alternative be utilized as a hydraulic liquid for the hydraulic linkage 46. Other hydraulic liquids may be used as a further alternative.

Figure 5:
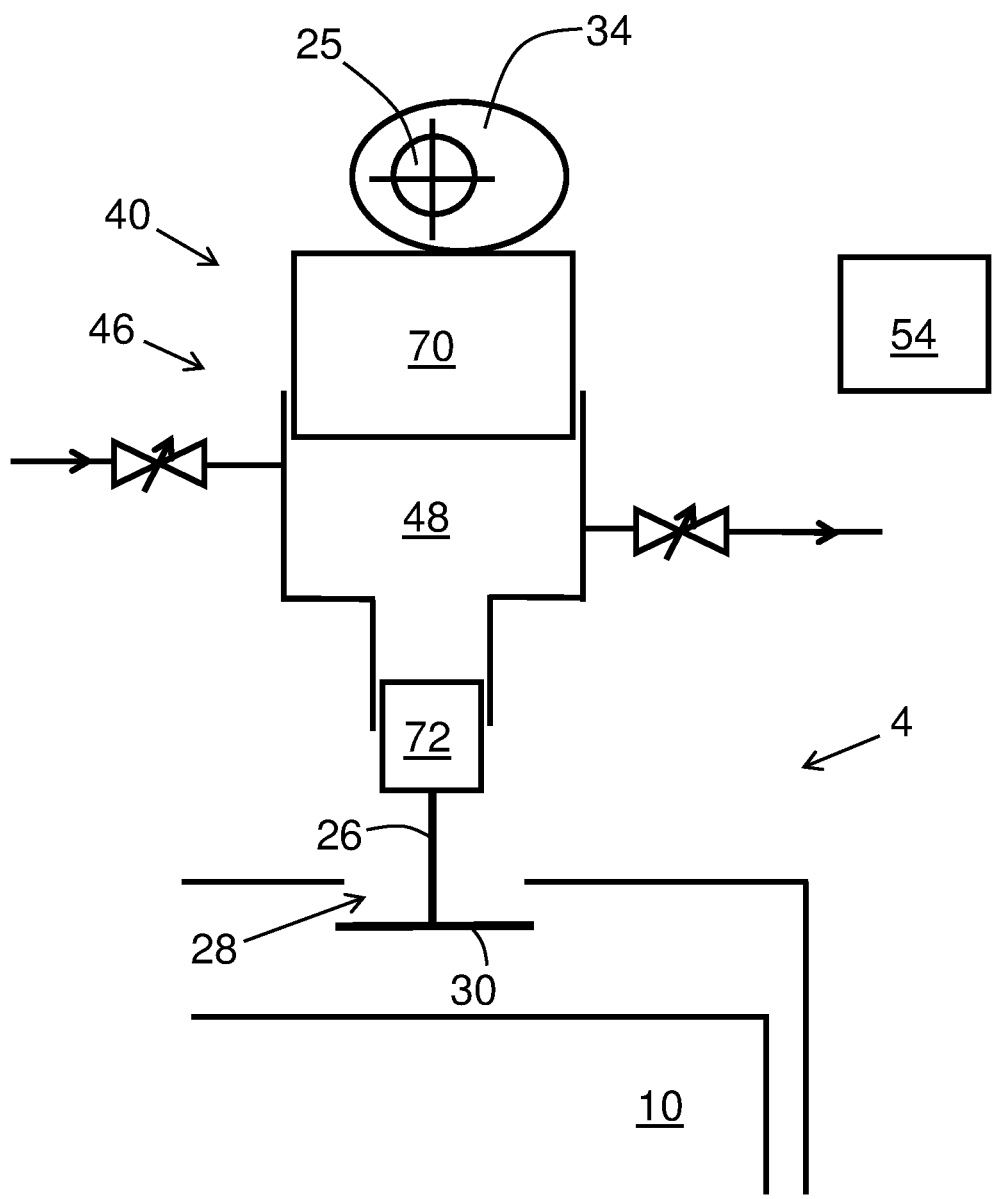

FIG. 5 schematically illustrates alternative embodiments of a first linkage arrangement 40 comprising a hydraulic linkage 46 arranged between the camshaft 25 and the exhaust valve head 30. These embodiments resemble in much the embodiments of FIG. 4. Mainly the differences between the two embodiments will be discussed in the following. Again, the hydraulic linkage 46, in a first state, is configured to transfer an input of the first lobe 34 to the exhaust valve head 30 to cause the motion of the exhaust valve head 30. The hydraulic linkage 46, in a second state, is configured to prevent the motion of the exhaust valve head 30. The hydraulic linkage 46, in a third state, is configured to reduce the motion of the exhaust valve head 30.

The hydraulic linkage 46 comprises a hydraulic cylinder 48 connected to a stem of the exhaust valve 26. The hydraulic cylinder 48 comprises a first piston 70 and a second piston 72. The first piston 70 abuts against the first lobe 34 of the camshaft 25 to follow the first lobe 34. The second piston 72 is connected to the exhaust valve head 30. Again, the hydraulic cylinder 48 is filled with, and emptied from, hydraulic liquid such that the hydraulic cylinder 48 in the first state is filled and remains filled with hydraulic liquid, and in the second state is emptied from hydraulic liquid. Thus, in the first state the motion of the first piston 70, caused by the first lobe 34, is transferred to the second piston 72, and in the second state the first piston 70 does not affect the second piston 72. Again, in the third state, the inlet valve 50 and the outlet valve 52 are controlled by the control unit 54 such that the outlet valve 52 is filed with, and partially emptied from, hydraulic liquid during a stroke of the piston 10 to achieve the reduced motion of the exhaust valve head 30.

According to embodiments, the hydraulic linkage 46 comprises a first piston 70 connected to the camshaft 25 and a second piston 72 connected to the exhaust valve head 30, and wherein the first piston 70 has a larger area than the second piston 72. That is, the first piston 70 has a larger area inside the hydraulic cylinder 48 than the second piston 72. Accordingly, a hydraulic gearing is achieved in the hydraulic cylinder 48. The second piston 72 will travel a longer distance than the first piston 70, proportionately to the area difference between the first and second pistons 70, 72. Also the speed of the second piston 72, and thus, the opening speed of the exhaust valve head 30 will be proportionately larger than the motion speed of the first piston 70 caused by the first lobe 34 e.g. in the first state. Accordingly, the opening speed of the exhaust opening 28 may be increased above that achieved by a 1:1 hydraulic gearing.

In alternative embodiments where no gearing is deemed necessary, the first and second pistons 70, 72 may have the same area inside the hydraulic cylinder 48.

Some embodiments of linkage arrangements 40, 41 comprising hydraulic linkages 46 for an ICE may be described e.g. in the following manner: The first linkage arrangement 40 may comprise a first hydraulic linkage 46 arranged between the at least one camshaft 25 and the exhaust valve head 30 and the second linkage arrangement 41 may comprise a second hydraulic linkage 46 arranged between the at least one camshaft 25 and the intake valve head 31. The first hydraulic linkage 46 in a first state may be configured to transfer an input of the first lobe 34 to the exhaust valve head 30 to cause the motion of the exhaust valve head 30. The first hydraulic linkage 46 in a second state may be configured to prevent the motion of the exhaust valve head 30. The second hydraulic linkage 46 in a first state may be configured to transfer an input of the second lobe 35 to the intake valve head 31 to cause the motion of the intake valve head 31. The second hydraulic linkage 46 in a second state may be configured to prevent the motion of the intake valve head 31, and wherein the first and second states of the first and second hydraulic linkages 46 are controllable by the control unit 54.

In a third state of at least one of the first and second hydraulic linkages 46, the first hydraulic linkage 46 may be configured to selectively reduce the motion of the exhaust valve head 30, and/or the second hydraulic linkage 46 may be configured to selectively reduce the motion of the intake valve head 31. The third state of the first and/or second hydraulic linkage 46 is controllable by the control unit 54.

Various other hydraulic linkages known in the prior art, such e.g. from U.S. Pat. No. 6,244,257, US 2007/0144467, or U.S. Pat. No. 5,996,550 may alternatively be utilized to change a motion of the exhaust valve head 30, and to change a motion of the intake valve head 31. Merely, since the camshafts of the therein disclosed ICE:s rotate at half the speed of the crankshaft, the control of such hydraulic linkages, and the stroke length of such hydraulic linkages, have to be adapted to ensure that the exhaust and inlet valve can remain closed during a stroke of the piston, when so required in a particular engine operational mode, as discussed below.

According to some embodiments, the at least one camshaft 25, 44 may be an overhead camshaft 25, 44 e.g. as illustrated in FIGS. 1-5. According to alternative embodiments, the at least one camshaft 25, 44 may be a camshaft arranged at the crankshaft 20.

Figure 6:
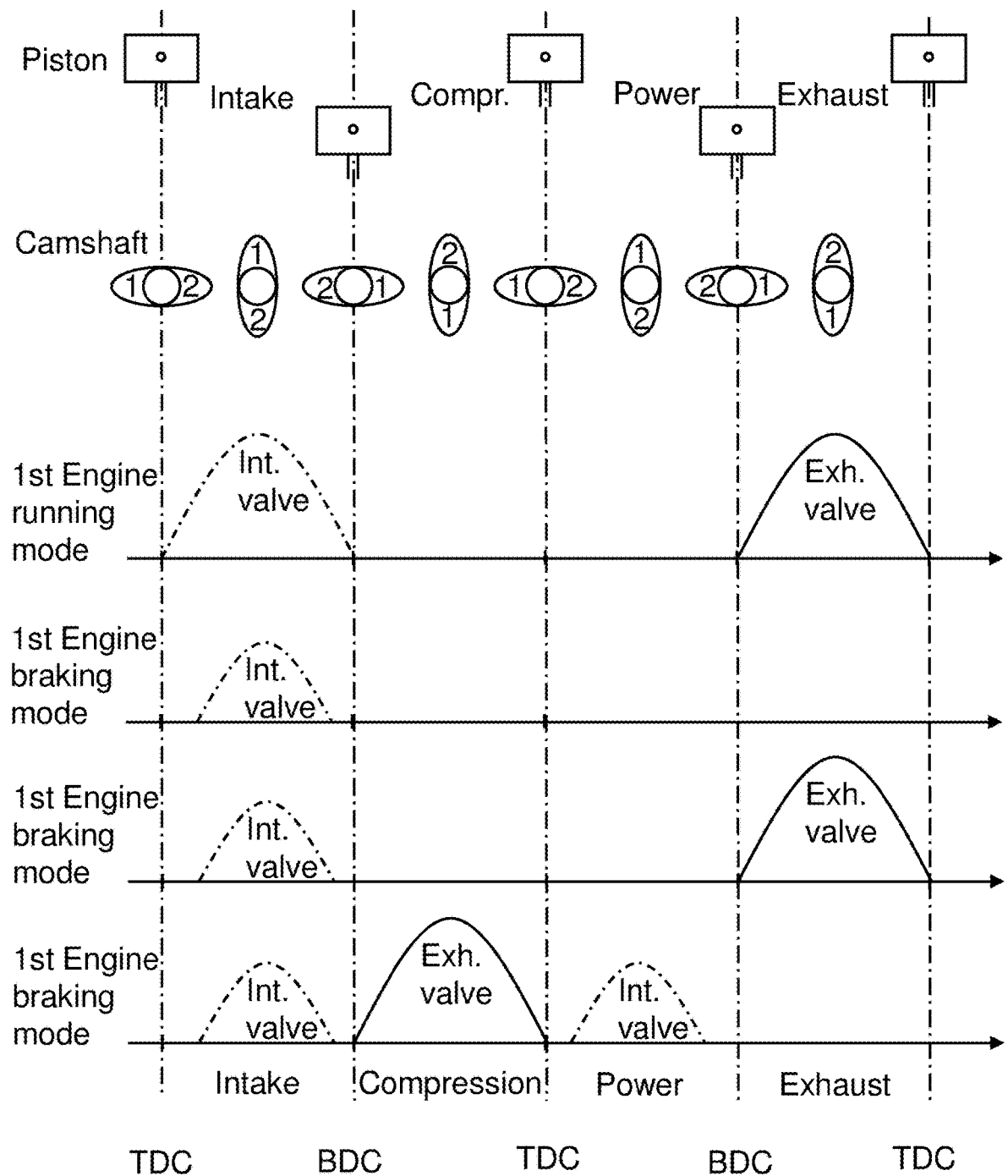

With reference to FIG. 6 some of the different possible opening and closing patterns of the exhaust and intake valve openings 28, 29 will be discussed. The patterns may also be referred to as modes. In FIG. 6 different modes of operation of an ICE 2 as shown in one of FIGS. 1-3 are visualized. Accordingly, in the following reference will be made to FIGS. 1-3 and 6. Linkage arrangements as discussed in connection with FIGS. 4 and 5 may be utilized.

In the top row of FIG. 6 TDC and BDC of the piston 10 as well as the four strokes of the piston 10 are indicated. At the second row of FIG. 6 positions of the first and second lobes 34, 35 are schematically shown, and indicated with numbers 1 and 2, for the respective first and second lobes. In the following rows of FIG. 6 the opening of the exhaust and intake valve openings 28, 29 for various operating modes of the ICE 2 are indicated with schematic graphs. That is, the graphs indicate when one of the first and second lobes 34, 35 causes a motion of the relevant valve head 30, 31, as well as when a motion of the relevant valve head 30, 31 is prevented. Moreover, the graphs indicate when one of the first and second lobes 34, 35 causes a reduced motion of the relevant valve head 30, 31. Motion of the exhaust valve head 30 is indicated by a continuous line, and motion of the intake valve head 31 is indicated by a dashed line with dots. A full movement (lift) of a valve head 30, 31 is indicated with a higher reaching graph than a reduced motion of a valve head 30, 31.

According to embodiments, the control unit 54 in a first engine running mode may be configured to control:
  the first linkage arrangement 40 to prevent the motion of the exhaust valve head 30 otherwise caused by the first lobe 34 at every alternate rotation of the at least one camshaft 25, such that the exhaust opening 28 remains closed during the compression stroke, and
  the second linkage arrangement 41 to prevent the motion of the intake valve head 31 otherwise caused by the second lobe 35 at every alternate rotation of the at least one camshaft 25 such that the intake opening 31 remains closed during the power stroke. In this manner, the ICE 2 will run in an ordinary mode of operation of a four-stroke internal combustion engine, herein also referred to as a first engine running mode. Fuel injected into the combustion chamber 23, or entrained with fresh gases into the combustion chamber 23, combusts e.g. at the start of the power stroke thus, driving the piston 10 and the crankshaft 20. The movements of the valve heads 30, 31 during the first engine running mode are schematically shown in the first graph of FIG. 6.

As discussed above, inter alia with reference to FIGS. 1-3, the control unit 54 is configured for controlling the first linkage arrangement 40 to selectively reduce the motion of the exhaust valve head 30, and/or configured for controlling the second linkage arrangement 41 to selectively reduce the motion of the intake valve head 31. In this manner, the first and second linkage arrangements 40, 41 will not only be able to prevent motions of the exhaust and intake valve heads 30, 31, but also be able to reduce the motion of the exhaust and intake valve heads 30, 31.

Reducing a motion duration of a valve head 30, 31 may entail starting a movement of at least one of the valve heads 30, 31 later than dictated by the relevant first or second lobe 34, 35, and/or ending a movement of at least one of the valve heads 30, 31 earlier than dictated by the relevant first or second lobe 34, 35. Reducing a motion duration of a valve head 30, 31, e.g. a reduction of the time during which the valve head 30, 31 is open, may for instance be utilized in embodiments wherein the first and second lobes 34, 35 are shaped such that they create an overlap, during which both the exhaust valve head 30 and the intake valve head 31 are open at a BDC and/or a TDC if the motion duration of the valve heads 30, 31 is not reduced. The overlap may be desirable during certain engine operating conditions, loads, rotational speed ranges, etc. During other engine operating conditions, loads, rotational speed ranges, etc. the overlap may be too long or may not at all be desirable and thus, may be reduced or eliminated by reducing the motion of the exhaust and/or intake valve heads 30, 31 in time.

Reduction of motion of the valve heads 30, 31 may be achieved, e.g. with one of the hydraulic linkages 46 discussed above in connection with FIGS. 4-5. An early emptying and/or a late filling of the hydraulic cylinder will reduce a motion duration of a relevant valve head 30, 31. Timing of emptying/filling of the hydraulic linkage 46 may be controlled by the control unit 54.

According to embodiments, the control unit 54 may be configured for:
controlling the first linkage arrangement 40 to selectively reduce the motion of the exhaust valve head 30 in amplitude during at least one of the intake stroke, the compression stroke, the power stroke, and the exhaust stroke, and/or
controlling the second linkage arrangement 41 to selectively reduce the motion of the intake valve head 31 in amplitude during at least one of the intake stroke, the compression stroke, the power stroke, and the exhaust stroke. In this manner, the gas flow into the combustion chamber and/or the gas flow out of the combustion chamber 23 may be reduced or throttled as compared to a full motion of the exhaust valve head 30 and the intake valve head 31, respectively. This may be utilized in many ways in an ICE 2 having at least one camshaft 25 rotating at a same rotational speed as the crankshaft 20, some examples of which are discussed below.

According to embodiments, the control unit 54 may be configured for:
controlling the first linkage arrangement 40 to selectively reduce the motion of the exhaust valve head 30 in time during at least one of the intake stroke, the compression stroke, the power stroke, and the exhaust stroke, and/or
controlling the second linkage arrangement 41 to selectively reduce the motion of the intake valve head 31 in time during at least one of the intake stroke, the compression stroke, the power stroke, and the exhaust stroke. In this manner, the gas flow into the combustion chamber and/or the gas flow out of the combustion chamber 23 may be reduced or throttled as compared to a full motion of the exhaust valve head 30 and the intake valve head 31, respectively. This may be utilized in many ways in an ICE 2 having at least one camshaft 25 rotating at a same rotational speed as the crankshaft 20, some examples of which are discussed below.

The reduced motion of the exhaust valve head 30 and/or the intake valve head 31 may be reduced both in amplitude and in time.

Figure 7:
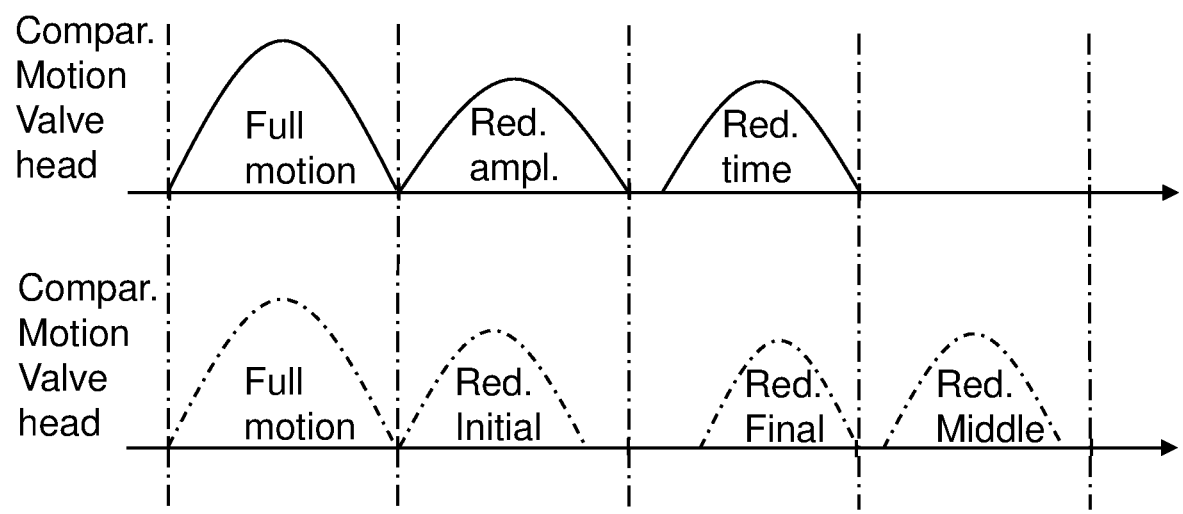
FIG. 7 illustrates various reduced motions of a valve head, FIG. 8 schematically illustrates embodiments of a cylinder arrangement of an ICE.

In FIG. 7 various reduced motions of a valve head achieved by controlling a linkage arrangement are illustrated. The valve head may be an exhaust valve head 30 or an intake valve head 31 as discussed above. The linkage arrangement may be a first or a second linkage arrangement 40, 41, as discussed above. The linkage arrangement is controlled by a control unit 54. Vertical lines in FIG. 7 illustrate BDC:s and TDC:s.

On the first horizontal line of FIG. 7 there are shown with full lines, first a full motion of a valve head during a stroke of the piston, followed by two examples of reduced motions of valve heads during strokes of the piston. The middle example shows a motion reduced in amplitude, and the last example shows a motion reduced in time. The last example is also reduced in amplitude.

On the second horizontal line of FIG. 7 there are shown various examples of reduced motions of a valve head in dashed lines with dots. Again, the first example shows a full motion of a valve head.

According to some embodiments, wherein the motion of the exhaust valve head 30 is reduced in time during a stroke, and/or the motion of the intake valve head 31 is reduced in time during a stroke, the control unit 54 may be configured for:
controlling the first linkage arrangement 40 to maintain the exhaust valve head 30 open during a first portion of a stroke of at least one of the intake stroke, the compression stroke, the power stroke, and the exhaust stroke, and to maintain the exhaust valve head 30 closed during a second portion of the stroke, and/or
controlling the second linkage arrangement 41 to maintain the intake valve head 31 open during a first portion of a stroke of at least one of the intake stroke, the compression stroke, the power stroke, and the exhaust stroke, and to maintain the intake valve head 31 closed during a second portion of the stroke. Thus, a reduced motion of a valve head 30, 31 during an initial portion of the relevant stroke may be achieved. This is shown by the second example with dash-dotted lines of FIG. 7. In these embodiments, the stroke is divided into two portions, the first portion during which the relevant valve head 30, 31 is open, and the second portion during which the relevant valve head 30, 31 is closed.

According to some embodiments, wherein the motion of the exhaust valve head 30 is reduced in time during a stroke, and/or the motion of the intake valve head 31 is reduced in time during a stroke, the control unit 54 may be configured for:
controlling the first linkage arrangement 40 to maintain the exhaust valve head 30 closed during a first portion of a stroke of at least one of the intake stroke, the compression stroke, the power stroke, and the exhaust stroke, and to maintain the exhaust valve head 30 open during a second portion of the stroke, and/or
controlling the second linkage arrangement 41 to maintain the intake valve head 31 closed during a first portion of a stroke of at least one of the intake stroke, the compression stroke, the power stroke, and the exhaust stroke, and to maintain the intake valve head 31 open during a second portion of the stroke. Thus, a reduced motion of a valve head 30, 31 during a final portion of the relevant stroke may be achieved. This is shown by the third example with dash-dotted lines of FIG. 7. In these embodiments, the stroke is divided into two portions, the first portion during which the relevant valve head 30, 31 is closed, and the second portion during which the relevant valve head 30, 31 is open.

According to some embodiments, wherein the motion of the exhaust valve head 30 is reduced in time during a stroke, and/or the motion of the intake valve head 31 is reduced in time during a stroke, the control unit 54 may be configured for:

controlling the first linkage arrangement 40 to maintain the exhaust valve head 30 closed during a first portion of a stroke of at least one of the intake stroke, the compression stroke, the power stroke, and the exhaust stroke, to maintain the exhaust valve head 30 open during a second portion of the stroke, and to maintain the exhaust valve head 30 closed during a third portion of the stroke, and/or controlling the second linkage arrangement 41 to maintain the intake valve head 31 closed during a first portion of a stroke of at least one of the intake stroke, the compression stroke, the power stroke, and the exhaust stroke, to maintain the intake valve head 31 open during a second portion of the stroke, and to maintain the intake valve head 31 closed during a third portion of the stroke. Thus, a reduced motion of a valve head 30, 31 during a middle portion of the relevant stroke is achieved. This is shown by the fourth example with dash-dotted lines of FIG. 7. In these embodiments, the stroke is divided into three portions, the first portion during which the relevant valve head 30, 31 is closed, the second portion during which the relevant valve head 30, 31 is open, and the third portion during which the relevant valve head 30, 31 is closed.

Returning to FIG. 6, an example use of reduced motion of a valve head is discussed. According to embodiments, the control unit 54 in a first engine braking mode may be configured to control:

the first linkage arrangement 40 to prevent the motion of the exhaust valve head 30, otherwise caused by the first lobe 34 at every rotation or every alternate rotation of the at least one camshaft 25, 44, such that the exhaust opening 28 remains closed during the compression stroke and/or during the exhaust stroke, and either the second linkage arrangement 41 to reduce the motion of the intake valve head 31 caused by the second lobe 35 at every rotation, such that the intake opening 29 is partially opened during the intake stroke and the power stroke, or the second linkage arrangement 41 to prevent the motion of the intake valve head 31 caused by the second lobe 35 at every alternate rotation of the at least one camshaft 25, 44, such that the intake opening 29 remains closed during the intake stroke or the power stroke, and to reduce the motion of the intake valve head 31 caused by the second lobe 35 at every alternate rotation of the at least one camshaft 25, 44, such that the intake opening 29 is partially opened during the other of the intake stroke and the power stroke. In this manner, the ICE 2 may be run to brake the rotational speed of the crankshaft 20. No fuel is injected into the combustion chamber 23 during the first engine braking mode. Thus, an internal load may be put on the ICE 2. For instance, such an internal load may be utilized for reducing a rotational speed of the crankshaft 20, or for producing hot exhaust gases from other cylinders of the relevant ICE 2, which in turn may heat up a catalytic reduction system for the exhaust gases of the ICE 2.

The first engine braking mode may be implemented with various movements of the valve heads 30, 31. Some implementations of the first engine braking mode are schematically shown in the second-fourth graphs of FIG. 6. Generally, closed valves will brake the movement of the piston 10 and thus, of the crankshaft 20, either by an overpressure building up in the combustion chamber 23 as the piston moves from BDC to TDC in the cylinder bore 12, or by a sub-atmospheric pressure building up in the combustion chamber 23 as the piston moves from TDC to BDC in the cylinder bore 12.

In the implementation of the first engine braking mode shown in the second graph of FIG. 6, the exhaust and intake openings 28, 29 are maintained closed during the compression, power, and exhaust strokes, while the intake opening 29 is partially opened during the intake stroke. Accordingly, the build-up of sub-atmospheric pressure in the combustion chamber 23 is interrupted when the intake opening 29 is opened. Thus, the braking effect on the crankshaft 20 is reduced. In this manner, the braking effect on the crankshaft may be controlled. The degree of opening the intake opening 29, and when during the intake stroke the intake opening 29 is opened, affects the build-up of sub-atmospheric pressure differently. Thus, also the braking effect may be controlled.

In the implementation of the first engine braking mode shown in the third graph of FIG. 6, the exhaust and intake openings 28, 29 are maintained closed during the compression and power strokes, while the intake opening 29 is partially opened during the intake stroke, and the exhaust opening 28 is fully opened during the exhaust stroke. Accordingly, the build-up of sub-atmospheric pressure in the combustion chamber 23 is interrupted when the intake opening 29 is opened, and no pressure is built up during the exhaust stroke. Thus, the braking effect on the crankshaft 20 is reduced. Again, the degree of opening the intake opening 29, and when during the intake stroke the intake opening 29 is opened, affects the build-up of sub-atmospheric pressure differently.

In the implementation of the first engine braking mode shown in the fourth graph of FIG. 6, the exhaust opening 28 is maintained closed during the exhaust stroke, while the intake opening 29 is partially opened during the intake stroke, and the power stroke, while the exhaust opening is fully opened during the compression stroke. Accordingly, the build-up of sub-atmospheric pressure in the combustion chamber 23 is interrupted when the intake opening 29 is opened during the intake and power strokes, and no pressure is built up during the compression stroke. Thus, the braking effect on the crankshaft 20 is reduced. The degree of opening the intake opening 29, and when during the intake stroke and the power stroke the intake opening 29 is opened, affects the build-up of sub-atmospheric pressure differently.

Moreover, the partial opening of the intake opening 29 during the intake and/or power stroke, and the resulting reduced build-up of sub-atmospheric pressure in the combustion chamber 23 reduces the risk of oil being drawn from the crankcase of the ICE 2 into the combustion chamber 23.

Figure 8:
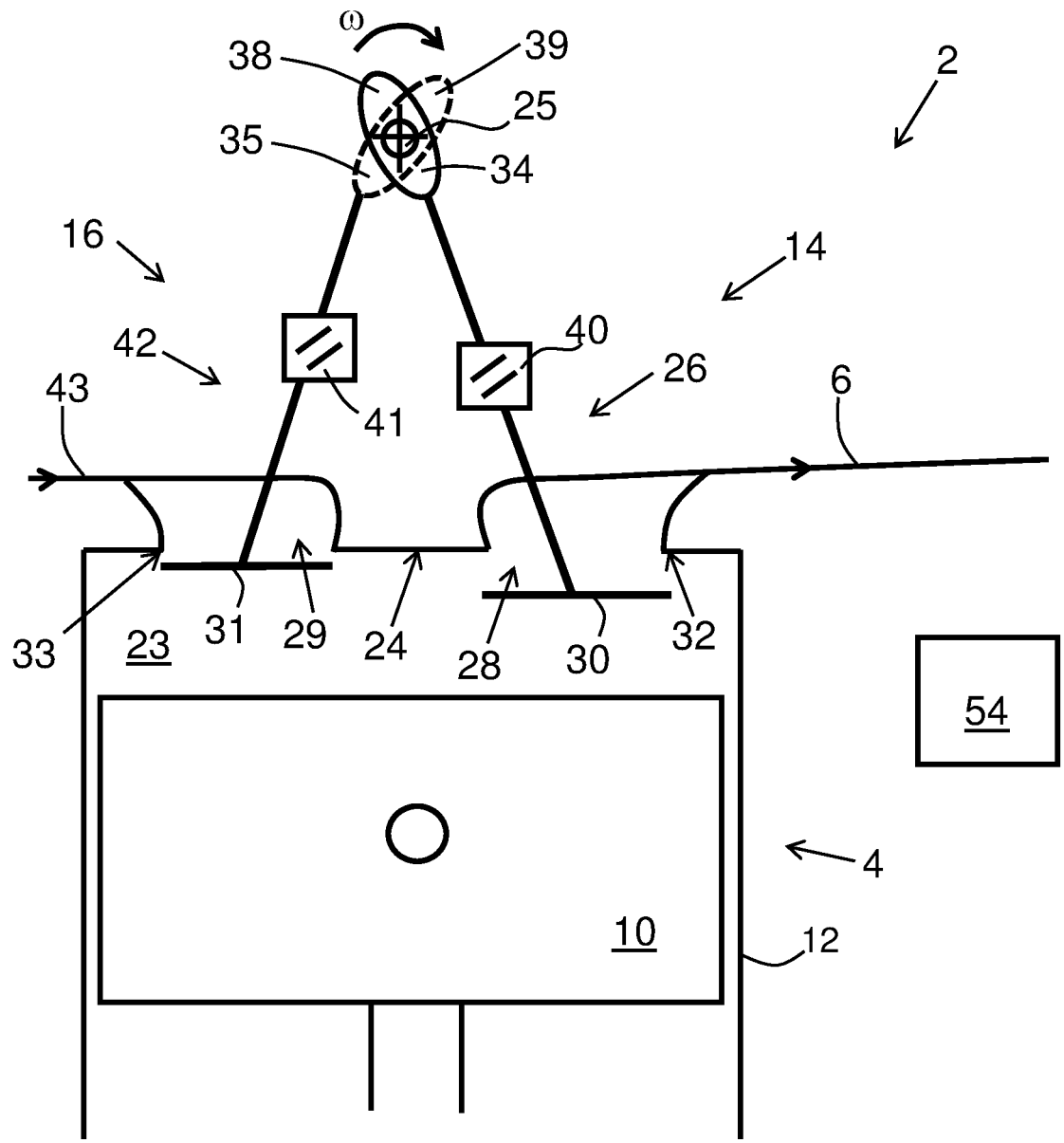

FIG. 8 schematically illustrates embodiments of at least one cylinder arrangement 4 of an ICE 2. These embodiments resemble in much the embodiments of FIGS. 1-3. Mainly the differences with the embodiments of FIGS. 1-3 will be discussed in the following.

Again, the ICE 2 comprises at least one cylinder arrangement 4, at least one camshaft 25, and a crankshaft 20. The at least one cylinder arrangement 4 comprises a piston 10, a cylinder bore 12, an exhaust arrangement 14, an intake arrangement 16, and a fuel injection arrangement, and/or an ignition device (not shown). The piston 10 is arranged to reciprocate in the cylinder bore 12.

The camshaft 25 comprise a first lobe 34 and a second lobe 35, and is arranged for controlling movement of the exhaust valve 26, and opening and closing of the exhaust valve 26, as well as controlling movement of the intake valve 42, and opening and closing of the intake valve 42. The control may be achieved in the same manner as in the previously discussed embodiments. Again, the exhaust arrangement 14 comprises a first linkage arrangement 40 configured to change the motion of the exhaust valve head 30 caused by the first lobe 34, and the intake arrangement 16 comprises a second linkage arrangement 41 configured to change the motion of the intake valve head 31 caused by the second lobe 35.

Again, the ICE 2 comprises a control unit 54 configured for controlling the first linkage arrangement 40 to selectively prevent the motion of the exhaust valve head 30, and the control unit 54 is configured for controlling the second linkage arrangement 41 to selectively prevent the motion of the intake valve head 31. Moreover, the control unit 54 is configured for controlling the first linkage arrangement 40 to selectively reduce the motion of the exhaust valve head 30, and/or for controlling the second linkage arrangement 41 to selectively reduce the motion of the intake valve head 31.

The camshaft 25 is synchronized with the crankshaft 20 to rotate at a same rotational speed as the crankshaft 20, i.e. the camshaft 25 has the same angular velocity, ω, as the crankshaft 20.

In these embodiments, the at least one camshaft 25 comprises a third lobe 38 configured to cause a motion of the exhaust valve head 30 for opening and closing the exhaust opening 28. The at least one camshaft 25 comprises a fourth lobe 39 configured to cause a motion of the intake valve head 31 for opening and closing the intake opening 29. The third lobe 38 may be arranged on the camshaft 25 substantially opposite to the first lobe 34. The fourth lobe 39 may be arranged on the camshaft 25 substantially opposite to the second lobe 35. The control unit 54 is configured for controlling the first linkage arrangement 40 to selectively prevent the motion of the exhaust valve head 30 otherwise caused by the third lobe 38, and for controlling the second linkage arrangement 41 to selectively prevent the motion of the intake valve head 31 otherwise caused by the fourth lobe 39. Further, the control unit 54 is configured for controlling the first linkage arrangement 40 to selectively reduce the motion of the exhaust valve head 30 caused by the third lobe 38, and/or for controlling the second linkage arrangement 41 to selectively reduce the motion of the intake valve head 31 caused by the fourth lobe 39.

In the schematically illustrates positions of the lobes 34, 35, 38, 39 in FIG. 8, the first lobe 34 provides an input to the exhaust valve head 30 to open the exhaust opening 28, while the second linkage arrangement 41 prevents the motion of the intake valve head 31 otherwise provided by the second lobe 35, to maintain the intake opening 29 closed.

The control unit 54 of the ICE 2 is configured to control the first and second linkage arrangements 40, 41 to achieve a number of different patterns for opening and closing of the exhaust valve opening 28 and the intake valve opening 29, and for reduced opening of the exhaust valve opening 28 and/or of the intake valve opening 29. The provision of two lobes, the first and third lobes 34, 38, for moving the exhaust valve 26, and two lobes, the second and fourth lobes 35, 39, for moving the intake valve 42, together with the first and second linkage arrangements 40, 41, provides for a flexibility in creating various patterns for opening and closing of the exhaust and intake valve openings 28, 29. Accordingly, the control unit 54 may be configured for operating the ICE 2 in various different modes, such as e.g. engine running modes, and engine braking modes.

For instance, the third lobe 38 may provide a full motion of the exhaust valve head 30 or a reduced motion of the exhaust valve head 31 during the intake stroke and/or during the power stroke, unless the first linkage arrangement 40 prevents the motion of the exhaust valve head 30. Similarly, the fourth lobe 39 may provide a full motion of the intake valve head 31 or a reduced motion of the intake valve head 31 during the compression stroke and/or during the exhaust stroke, unless the second linkage arrangement 41 prevents the motion of the intake valve head 31.

In an engine running mode, the at least one cylinder arrangement 4 is run through its four strokes with fuel combusting during the power stroke e.g. in order to propel a vehicle, in which the ICE 2 is mounted. In an engine braking mode, no fuel is injected into the cylinder arrangement 4 and resistance of the piston 10 reciprocating in the cylinder bore is increased in order to brake the crankshaft 20.

According to alternative embodiments, the ICE 2 may comprise a first camshaft 25 and a second camshaft 44, as discussed in connection with FIG. 3. In such embodiments the first camshaft 25 may comprise the third lobe 38 and the second camshaft 44 may comprise the fourth lobe 39.

Figure 9:
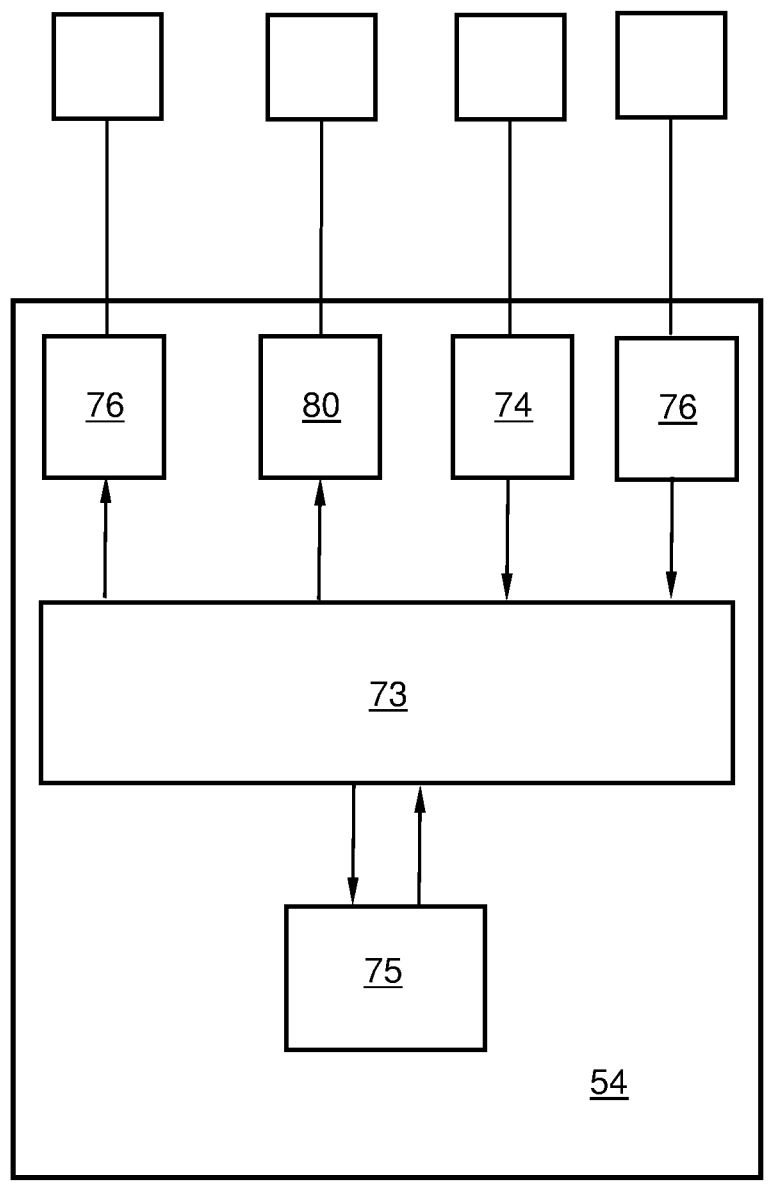
FIG. 9 illustrates a control unit, FIGS. 10a and 10b schematically illustrate some of the different possible opening and closing patterns of exhaust and intake valve openings.

FIG. 9 illustrates a control unit 54 to be utilized in connection with the different aspects and/or embodiments. The control unit 54 comprises a calculation unit 73 which may take the form of substantially any suitable type of processor circuit or microcomputer, e.g. a circuit for digital signal processing (digital signal processor, DSP), a Central Processing Unit (CPU), a processing unit, a processing circuit, a processor, an Application Specific Integrated Circuit (ASIC), a microprocessor, or other processing logic that may interpret and execute instructions. The herein utilized expression "calculation unit" may represent a processing circuitry comprising a plurality of processing circuits, such as, e.g., any, some or all of the ones mentioned above. The control unit 54 comprises a memory unit 75. The calculation unit 73 is connected to the memory unit 75, which provides the calculation unit 54 with, for example, stored programme code and/or stored data which the calculation unit 73 needs to enable it to do calculations. The calculation unit 73 is also adapted to storing partial or final results of calculations in the memory unit 75. The memory unit 75 may comprise a physical device utilized to store data or programs, i.e., sequences of instructions, on a temporary or permanent basis. According to some embodiments, the memory unit 75 may comprise integrated circuits comprising silicon-based transistors. The memory unit 75 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control unit 54 is further provided with respective devices 74, 76, 78, 80 for receiving and/or sending input and output signals. These input and output signals may comprise waveforms, pulses or other attributes which input signal receiving devices 74, 76 can detect as information and which can be converted to signals processable by the calculation unit 73. These signals are then supplied to the calculation unit 73. Output signal sending devices 78, 80 are arranged to convert calculation results from the calculation unit 73 to output signals for conveying to other parts of the engine control system and/or the component or components for which the signals are intended, such as e.g. the control of the first and second linkage arrangements 40, 41. Each of the connections to the respective devices for receiving and sending input and output signals may take the form of one or more from among a cable, a data bus, e.g. a CAN (controller area network) bus, a MOST (media orientated systems transport) bus or some other bus configuration, or a wireless connection. In the embodiment depicted, an implementation comprising one control unit 54 shown, but might alternatively be implemented wholly or partly utilizing one or more further control units.

Figure 10A:
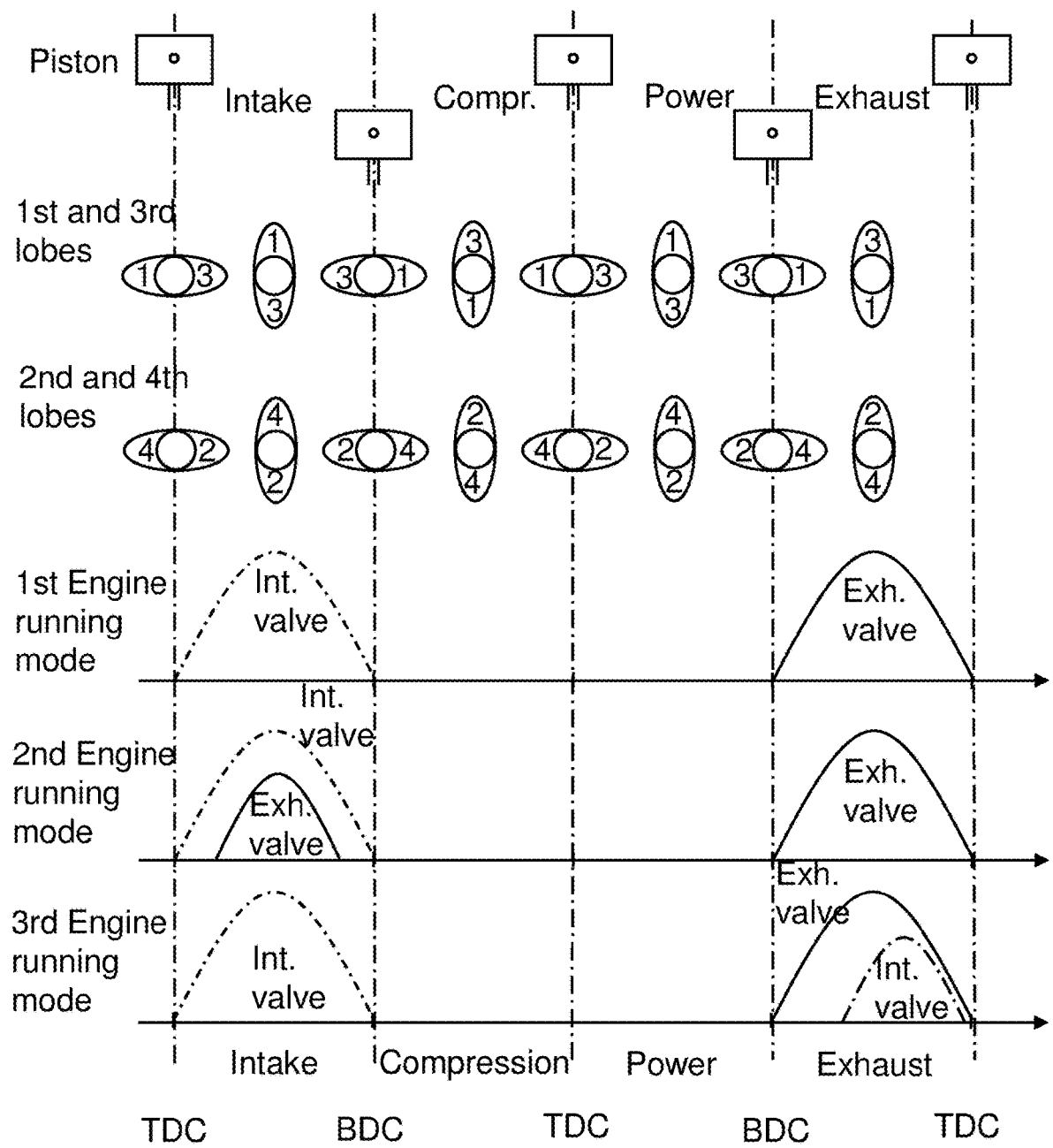
Figure 10B:
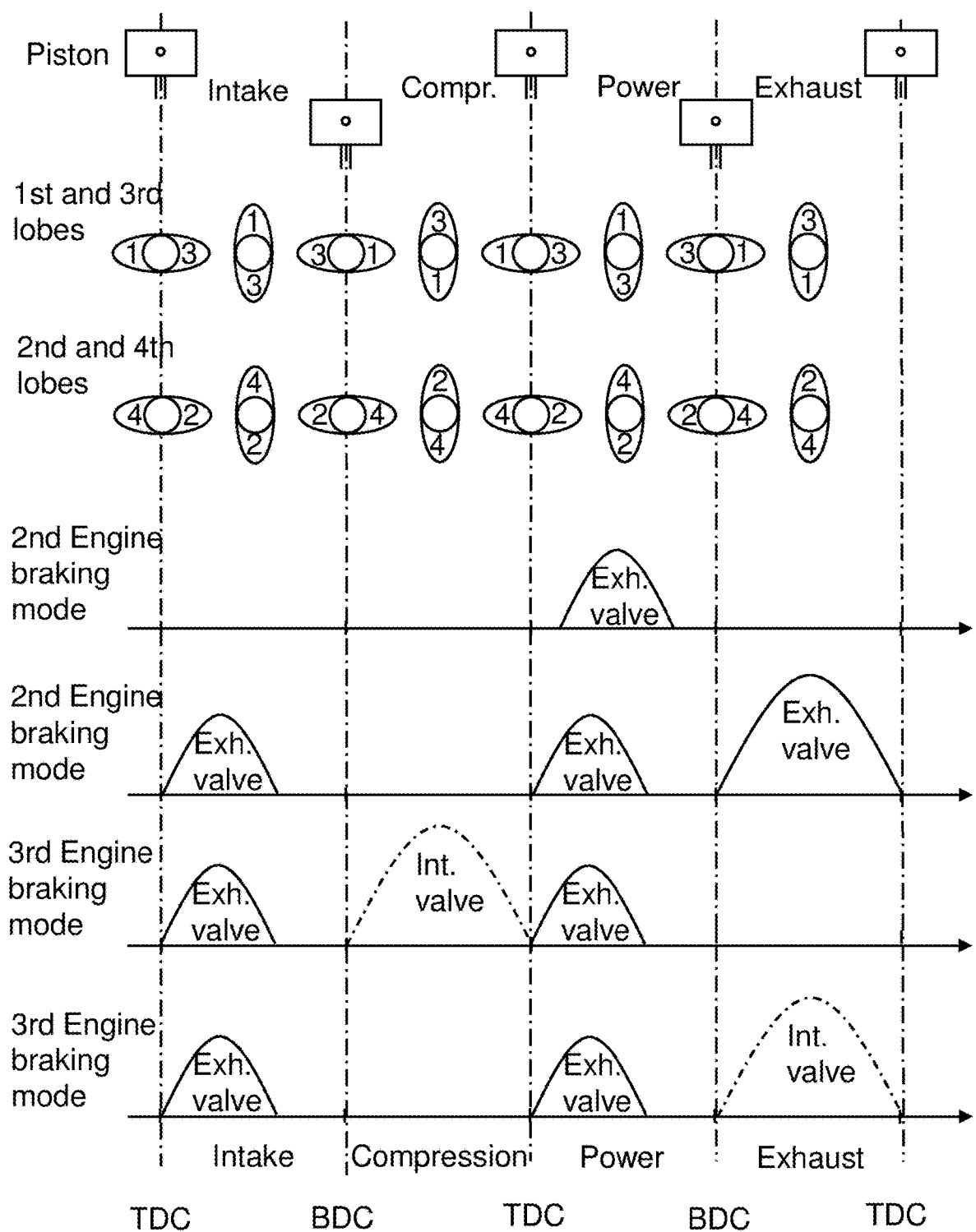

With reference to FIGS. 10a and 10b some of the different possible opening and closing patterns of the exhaust and intake valve openings 28, 29 will be discussed. The patterns may also be referred to as modes. In FIGS. 10a and 10b different modes of operation of an ICE 2 e.g. as shown in FIG. 8 are visualized. Accordingly, in the following reference will be made to FIGS. 8 and 10. Again, linkage arrangements 40, 41 as discussed in connection with FIGS. 4 and 5 may be utilized.

In the top row of FIGS. 10a and 10b TDC and BDC of the piston 10 as well as the four strokes of the piston 10 are indicated. At the second row of FIGS. 10a and 10b positions of the first and third lobes 34, 38 are schematically shown, and indicated with numbers 1 and 3. At the third row, positions of the second and fourth lobes 35, 39 are schematically shown, and indicated with numbers 2 and 4. In the following rows of FIGS. 10a and 10b the opening of the exhaust and intake valve openings 28, 29 for various operating modes of the ICE 2 are indicated with schematic graphs. That is, the graphs indicate when one of the first fourth lobes 34, 35, 38, 39 causes a motion of the relevant valve head 30, 31. Again, motion of the exhaust valve head 30 is indicated with a continuous line, and motion of the intake valve head 31 is indicated with a dashed line with dots.

For the first engine running mode discussed above, in embodiments of the ICE 2 comprising the third and fourth lobes 38, 39, the control unit 54 may be further configured to control:

the first linkage arrangement 40 to prevent the motion of the exhaust valve head 30 otherwise caused by the third lobe 38 at every rotation of the at least one camshaft 25, such that the exhaust opening 28 remains closed during the intake stroke and the power stroke, and the second linkage arrangement 41 to prevent the motion of the intake valve head 31 otherwise caused by the fourth lobe 39 at every rotation of the at least one camshaft 25 such that the intake opening 29 remains closed during the compression stroke and the exhaust stroke. In this manner, the ICE 2 will run in an ordinary mode of operation of a four-stroke internal combustion engine. The movements of the valve heads 30, 31 related to the first and second lobes 34, 35 are controlled as discussed above with reference to FIG. 6 and the first engine running mode. Fuel injected into the combustion chamber 23, or entrained with fresh gases into the combustion chamber 23, combusts e.g. at the start of the power stroke thus, driving the crankshaft 20. The movements of the valve heads 30, 31 during the first engine running mode are schematically shown in the first graph of FIG. 10a.

According to embodiments, the control unit 54 in a second engine running mode may be configured to control:

the first linkage arrangement 40 to prevent the motion of the exhaust valve head 30 otherwise caused by the first lobe 34 at every alternate rotation of the at least one camshaft 25, 44, such that the exhaust opening 28 remains closed during the compression stroke, the first linkage arrangement 40 to prevent the motion of the exhaust valve head 30 otherwise caused by the third lobe 38 at every alternate rotation of the at least one camshaft 25, 44, such that the exhaust opening 28 remains closed during the power stroke, the first linkage arrangement 40 to reduce the motion of the exhaust valve head 30 caused by the third lobe 38 at every alternate rotation of the at least one camshaft 25, 44, such that the exhaust opening 28 is partially opened during the intake stroke, the second linkage arrangement 41 to prevent the motion of the intake valve head 31 otherwise caused by the second lobe 35 at every alternate rotation of the at least one camshaft 25, 44 such that the intake opening 31 remains closed during the power stroke, and the second linkage arrangement 41 to prevent the motion of the intake valve head 31 otherwise caused by the fourth lobe 39 at every rotation of the at least one camshaft 25, 44 such that the intake opening 29 remains closed during the compression stroke and the exhaust stroke. In this manner, the ICE 2 may run in a mode of operation wherein the ICE 2 produces power, but wherein a gas flow through the ICE 2 may be reduced due to the partial opening of the exhaust valve head 30 during the intake stroke, which may cause some of the exhaust gas from the exhaust conduit 6 to be drawn back into the combustion chamber 23. Again, fuel is injected into the combustion chamber 23, or entrained with fresh gases into the combustion chamber 23, and combusts e.g. at the start of the power stroke thus, driving the crankshaft 20. The movements of the valve heads 30, 31 during the second engine running mode are schematically shown in the second graph of FIG. 10a.

The reduced gas flow through the ICE 2 during the second engine running mode may prevent cooling of an aftertreatment system 9, such as e.g. a catalytic reduction system. This may be achieved without an overlap between the exhaust and intake valves, i.e. without the exhaust valve and intake valve having to be open simultaneously around the TDC, which in turn requires a piston adapted with recesses for fitting the valve. Such a piston with recesses might affect the combustion in the combustion chamber negatively. Accordingly, due to the provision of the second engine running mode of the ICE 2, the piston 10 may be shaped to promote efficient combustion in the combustion chamber 23.

According to embodiments, the control unit 54 in a third engine running mode may be configured to control:

the first linkage arrangement 40 to prevent the motion of the exhaust valve head 30 otherwise caused by the first lobe 34 at every alternate rotation of the at least one camshaft 25, 44, such that the exhaust opening 28 remains closed during the compression stroke, the first linkage arrangement 40 to prevent the motion of the exhaust valve head 30 otherwise caused by the third lobe 38 at every rotation of the at least one camshaft 25, 44, such that the exhaust opening 28 remains closed during the intake stroke and the power stroke, the second linkage arrangement 41 to prevent the motion of the intake valve head 31 otherwise caused by the second lobe 35 at every alternate rotation of the at least one camshaft 25, 44 such that the intake opening 31 remains closed during the power stroke, the second linkage arrangement 41 to reduce the motion of the intake valve head 31 caused by the fourth lobe 39 at every alternate rotation of the at least one camshaft 25, 44, such that the intake opening 29 is partially opened during the exhaust stroke, and the second linkage arrangement 41 to prevent the motion of the intake valve head 31 otherwise caused by the fourth lobe 39 at every alternate rotation of the at least one camshaft 25, 44 such that the intake opening 29 remains closed during the compression stroke. In this manner, the ICE 2 may run in a mode of operation wherein the ICE 2 produces power, and wherein a gas flow through the ICE 2 may be increased due to the partial opening of the intake valve head 31 during the exhaust stroke, which may cause some of the intake gas to be ejected directly from the combustion chamber 23 to the exhaust conduit 6. Again, fuel is injected into the combustion chamber 23, or entrained with fresh gases into the combustion chamber 23, and combusts e.g. at the start of the power stroke thus, driving the crankshaft 20. The movements of the valve heads 30, 31 during the third engine running mode are schematically shown in the third graph of FIG. 10*a*. Since a higher gas pressure is required in the intake conduit 5 than in the exhaust conduit 6 for the intake gas to be ejected through the exhaust opening 28, the partial opening of the intake valve head 31 may be performed during a final portion of the exhaust stroke. Moreover, the intake gas pressure may be produced by e.g. a turbocharger.

The increased gas flow through the ICE 2 during the third engine running mode may increase the flow of gas through the turbine 8 of a turbocharger. Thus, the turbocharger may be driven to a higher rotational speed increasing the intake gas pressure, compared to if only exhaust gas would drive the turbine 8.

With reference to the second and third engine running modes it is remarked that in both of the first and second engine running modes, a gas flow through the ICE 2 may be increased or alternatively decreased. Generally, a positive pressure difference between the intake conduit 5 and the exhaust conduit 6 when both the valve heads 30, 31 are open increases a gas flow through the ICED 2. Conversely, a negative pressure difference between the intake conduit 5 and the exhaust conduit 6 when both the valve heads 30, 31 are open decreases the gas flow through the ICE 2. A positive pressure difference entails a higher pressure in the intake conduit 5 than in the exhaust conduit 6. A negative pressure difference entails a lower pressure in the intake conduit 5 than in the exhaust conduit 6.

Again, in embodiments of the ICE 2 comprising the third and fourth lobes 38, 39, the control unit 54 in a second engine braking mode may be configured to control:

the first linkage arrangement 40 to prevent the motion of the exhaust valve head 30, otherwise caused by the first lobe 34 at every rotation or every alternate rotation of the at least one camshaft 25, 44, such that the exhaust opening 28 remains closed during the compression stroke and/or during the exhaust stroke, the first linkage arrangement 40 to reduce the motion of the exhaust valve head 30 caused by the third lobe 38 at every rotation or every alternate rotation of the at least one camshaft 25, 44, such that the exhaust opening 28 is partially opened during the intake stroke and/or the power stroke, and the second linkage arrangement 41 to prevent the motion of the intake valve head 31 otherwise caused by the second lobe 35 and the fourth lobe 39 at every rotation of the at least one camshaft 25, 44 such that the intake opening 29 remains closed during the intake stroke, the compression stroke, the power stroke, and the exhaust stroke.

The second engine braking mode may be implemented with various movements of the valve heads 30, 31. Two implementations of the second engine braking mode are schematically shown in the first and second graphs of FIG. 10*b*. As mentioned above, generally, closed valves will brake the movement of the piston 10 and thus, of the crankshaft 20, either by an overpressure building up in the combustion chamber 23 as the piston moves from BDC to TDC in the cylinder bore 12, or by a sub-atmospheric pressure building up in the combustion chamber 23 as the piston moves from TDC to BDC in the cylinder bore 12.

In the implementation of the second engine braking mode shown in the first graph of FIG. 10*b*, the exhaust opening 28 is maintained closed during the intake, compression, and exhaust strokes, the intake opening 29 is maintained closed during all strokes, and the exhaust opening 28 is partially opened during the power stroke. Accordingly, the build-up of sub-atmospheric pressure in the combustion chamber 23 is interrupted when the exhaust opening 28 is opened. Thus, the braking effect on the crankshaft 20 is reduced. The degree of opening the exhaust opening 28, and when during the power stroke the exhaust opening 28 is opened, affects the build-up of sub-atmospheric pressure differently. Thus, also in this manner the braking effect may be controlled.

In the implementation of the second engine braking mode shown in the second graph of FIG. 10*b*, the exhaust and intake openings 28, 29 are maintained closed during the compression stroke, the intake opening 29 is further maintained closed during the intake, power, and exhaust strokes, the exhaust opening 28 is fully opened during the exhaust stroke, and the exhaust opening 28 is partially opened during the intake and power strokes. Accordingly, the build-up of sub-atmospheric pressure in the combustion chamber 23 is interrupted when the exhaust opening 28 is partially opened during the intake and power strokes. Thus, the braking effect on the crankshaft 20 is reduced. In this manner, the braking effect on the crankshaft may be controlled. The degree of opening the exhaust opening 28, and when during the intake and power strokes the exhaust opening 28 is opened, affects the build-up of sub-atmospheric pressure differently.

Again, the partial opening of the exhaust opening 28 during the intake and/or power stroke, and the resulting reduced build-up of sub-atmospheric pressure in the combustion chamber 23 reduces the risk of oil being drawn from the crankcase of the ICE 2 into the combustion chamber 23.

According to embodiments, the control system 54 in a third engine braking mode may be configured to control:

the first linkage arrangement 40 to prevent the motion of the exhaust valve head 30, otherwise caused by the first lobe 34 at every alternate rotation of the at least one camshaft 25, 44, and the second linkage arrangement 41 to prevent the motion of the intake valve head 31 otherwise caused by the fourth lobe 39 at every alternate rotation of the at least one camshaft 25, 44, such that the exhaust opening 28 remains closed during the compression stroke or during the exhaust stroke, the first linkage arrangement 40 to reduce the motion of the exhaust valve head 30 caused by the third lobe 38 at every rotation or every alternate rotation of the at least one camshaft 25, 44, such that the exhaust opening 28 is partially opened during the intake stroke and/or the power stroke, and the second linkage arrangement 41 to prevent the motion of the intake valve head 31 otherwise caused by the second lobe 35 at every rotation of the at least one camshaft 25, 44 such that the intake opening 29 remains closed during the intake stroke, and the power stroke.

The third engine braking mode may be implemented with various movements of the valve heads 30, 31. Two implementations of the third engine braking mode are schematically shown in the third and fourth graphs of FIG. 10b.

In the implementation of the third engine braking mode shown in the third graph of FIG. 10b, the exhaust opening 28 is maintained closed during the compression and exhaust strokes, the intake opening 29 is maintained closed during the intake, power, and exhaust strokes, the intake opening 29 is fully opened during compression stroke, and the exhaust opening 28 is partially opened during the intake and power strokes. Accordingly, the build-up of sub-atmospheric pressure in the combustion chamber 23 is interrupted when the exhaust opening 28 is partially opened, and no pressure is built up during the compression stroke. Thus, the braking effect on the crankshaft 20 is reduced. The degree of opening the exhaust opening 28, and when during the intake and power strokes the exhaust opening 28 is opened, affects the build-up of sub-atmospheric pressure differently. Thus, also in this manner the braking effect may be controlled.

In the implementation of the third engine braking mode shown in the fourth graph of FIG. 10b, the exhaust and intake openings 28, 29 are maintained closed during the compression stroke, the intake opening 29 is maintained closed during the intake and power strokes, the exhaust opening 28 is maintained closed during the exhaust stroke, the intake opening 29 is fully opened during the exhaust stroke, and the exhaust opening 28 is partially opened during the intake and power strokes. Accordingly, the build-up of sub-atmospheric pressure in the combustion chamber 23 is interrupted when the exhaust opening 28 is partially opened during the intake and power strokes. Thus, the braking effect on the crankshaft 20 is reduced. In this manner, the braking effect on the crankshaft may be controlled. The degree of opening the exhaust opening 28, and when during the intake and power strokes the exhaust opening 28 is opened, affects the build-up of sub-atmospheric pressure differently.

It may be noted that some of the implementations of the third engine braking mode correspond to implementations of the second engine braking mode.

Figure 11A:
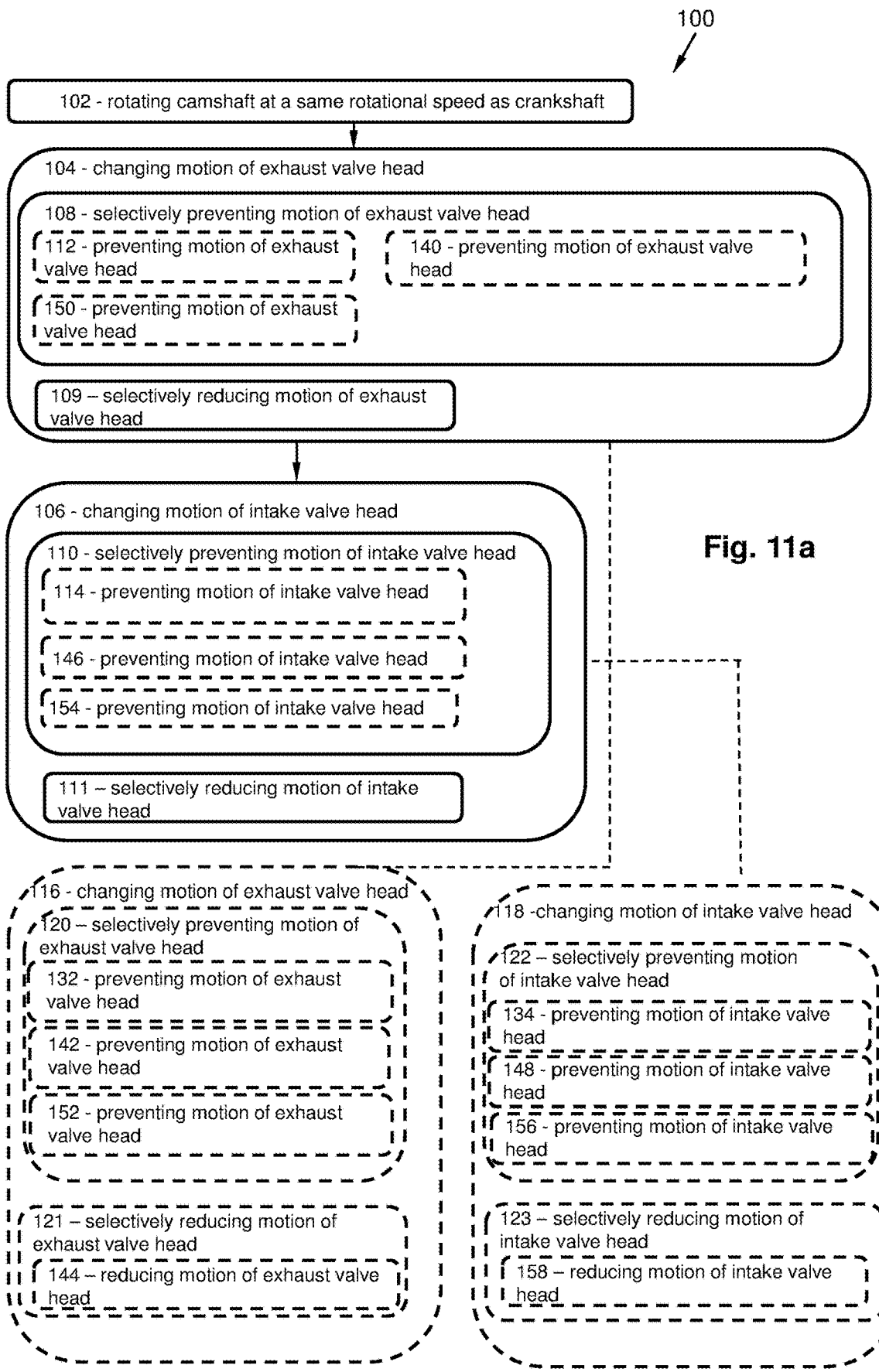
FIGS. 11a and 11b illustrate embodiments of a method for controlling a four-stroke ICE.
Figure 11B:
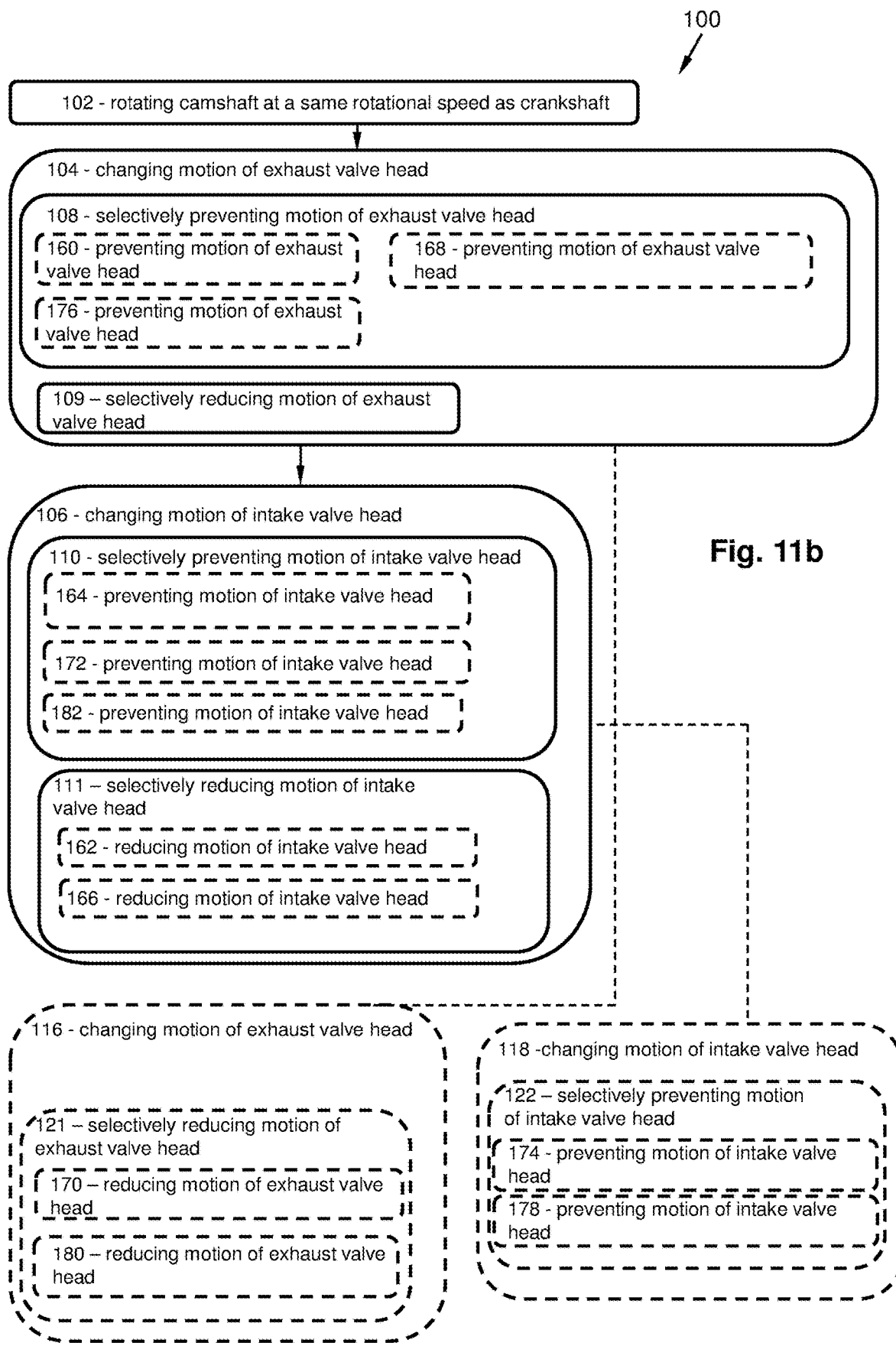

FIGS. 11a and 11b illustrate embodiments of a method 100 for controlling a four-stroke ICE according to aspects and/or embodiments discussed herein. Accordingly, reference is also made to FIGS. 1-10b in the following.

First the method 100 will be discussed with reference to FIG. 11a.

According to embodiments wherein the at least one camshaft 25, 44 comprises a first lobe 34 and a second lobe 35, the method 100 comprises steps of:

rotating 102 the at least one camshaft 25, 44 at a same rotational speed as the crankshaft 20, changing 104 the motion of the exhaust valve head 30 caused by the first lobe 34 by means of a first linkage arrangement 40 comprised in the exhaust arrangement 14, changing 106 the motion of the intake valve head 31 caused by the second lobe 35 by means of a second linkage arrangement 41 comprised in the intake arrangement 16, wherein the step of changing 104 the motion of the exhaust valve head 30 caused by the first lobe 34 comprises steps of:

selectively preventing 108 the motion of the exhaust valve head 30 caused by the first lobe 34, and selectively reducing 109 the motion of the exhaust valve head 30 caused by the first lobe 34, and wherein the step of changing 106 the motion of the intake valve head 31 caused by the second lobe 35 comprises steps of:

selectively preventing 110 the motion of the intake valve head 31 caused by the second lobe 35, and selectively reducing 111 the motion of the intake valve head 31 caused by the second lobe 35. In this manner, the ICE 2 may be controlled to operate in a first engine running mode, and a first engine braking mode, as discussed above with reference inter alia to FIG. 6.

According to embodiments wherein the at least one camshaft 25, 44 comprises a first lobe 34 and a second lobe 35, in a first engine running mode of the method 100, the step of selectively preventing 108 the motion of the exhaust valve head 30 may comprise a step of:

preventing 112 the motion of the exhaust valve head 30 otherwise caused by the first lobe 34 at every alternate rotation of the at least one camshaft 25, 44, such that the exhaust opening 28 remains closed during the compression stroke, and wherein the step of selectively preventing 110 the motion of the intake valve head may comprise a step of:

preventing 114 the motion of the intake valve head 31 otherwise caused by the second lobe 35 at every alternate rotation of the at least one camshaft 25, 44 such that the intake opening 29 remains closed during the power stroke. In this manner, the ICE 2 may be operated in an ordinary engine running mode, in which the piston 10 drives the at least one camshaft 25, 44, despite the at least one camshaft 25, 44 rotating at the same rotational speed as the crankshaft 20, as discussed above with reference to FIG. 6. The intake opening 29 is opened during the intake stroke and the exhaust opening 28 is opened during the exhaust stroke. Fuel injected into the combustion chamber 23, or entrained with fresh gases into the combustion chamber 23, combusts e.g. at the start of the power stroke thus, driving the piston 10 and the crankshaft 20.

According to embodiments, wherein the at least one camshaft 25, 44 comprises a third lobe 38 and a fourth lobe 39, the method 100 may comprise further steps of:

changing 116 the motion of the exhaust valve head 30 caused by the third lobe 38 by means of a first linkage arrangement 40, changing 118 the motion of the intake valve head 31 caused by the fourth lobe 39 by means of a second linkage arrangement 41, wherein, the step of changing 116 the motion of the exhaust valve head 30 caused by the third lobe 38 comprises steps of:

selectively preventing 120 the motion of the exhaust valve head 30 caused by the third lobe 38, and selectively reducing 121 the motion of the exhaust valve head 30 caused by the third lobe 38, and wherein the step of changing 118 the motion of the intake valve head 31 caused by the fourth lobe 39 comprises steps of:

selectively preventing 122 the motion of the intake valve head 31 caused by the fourth lobe 39, and selectively reducing 123 the motion of the intake valve head 31 caused by the fourth lobe 39. In this manner, the ICE 2 may be controlled to operate e.g. in further engine running modes, and engine braking modes, as discussed below, and above with reference inter alia to FIGS. 10a and 10b.

According to embodiments, wherein the at least one camshaft 25, 44 comprises a third lobe 38 and a fourth lobe 39, in the first engine running mode of the method 100, the step of selectively preventing 108 the motion of the exhaust valve head 30 caused by the first lobe 34 comprises steps of:
  preventing 112 the motion of the exhaust valve head 30 otherwise caused by the first lobe 34 at every alternate rotation of the at least one camshaft 25, 44, such that the exhaust opening 28 remains closed during the compression stroke, wherein the step of selectively preventing 110 the motion of the intake valve head 31 caused by the second lobe 35 comprises a step of:
  preventing 114 the motion of the intake valve head 31 otherwise caused by the second lobe 35 at every alternate rotation of the at least one camshaft 25, 44 such that the intake opening remains closed during the power stroke, wherein the step of selectively preventing 120 the motion of the exhaust valve head 30 caused by the third lobe 38 comprises a step of:
  preventing 132 the motion of the exhaust valve head 30 otherwise caused by the third lobe 38 at every rotation of the at least one camshaft 25, 44, such that the exhaust opening 28 remains closed during the intake stroke and the power stroke, and wherein the step of selectively preventing 122 the motion of the intake valve head 31 caused by the fourth lobe 39 comprises a step of:
  preventing 134 the motion of the intake valve head 31 otherwise caused by the fourth lobe 39 at every rotation of the at least one camshaft 25, 44 such that the intake opening 29 remains closed during the compression stroke and the exhaust stroke. In this manner, the ICE 2 may be operated in an ordinary engine running mode, in which the piston 10 drives the at least one camshaft 25, 44, despite the at least one camshaft 25, 44 rotating at the same rotational speed as the crankshaft 20, as discussed above with reference to FIG. 10a. The intake opening 29 is opened during the intake stroke and the exhaust opening 28 is opened during the exhaust stroke. Fuel injected into the combustion chamber 23, or entrained with fresh gases into the combustion chamber 23, combusts e.g. at the start of the power stroke thus, driving the piston 10 and the crankshaft 20.

According to embodiments, in a second engine running mode of the method 100, the step of selectively preventing 108 the motion of the exhaust valve head 30 caused by the first lobe 34 comprises a step of:
  preventing 140 the motion of the exhaust valve head 30 otherwise caused by the first lobe 34 at every alternate rotation of the at least one camshaft 25, 44, such that the exhaust opening 28 remains closed during the compression stroke, wherein the step of selectively preventing 120 the motion of the exhaust valve head 30 caused by the third lobe 38 comprises a step of:
  preventing 142 the motion of the exhaust valve head 30 otherwise caused by the third lobe 38 at every alternate rotation of the at least one camshaft 25, 44, such that the exhaust opening 28 remains closed during the power stroke, wherein the step of selectively reducing 121 the motion of the exhaust valve head 30 caused by the third lobe 38 comprises a step of:
  reducing 144 the motion of the exhaust valve head 30 caused by the third lobe 38 at every alternate rotation of the at least one camshaft 25, 44, such that the exhaust opening 28 is partially opened during the intake stroke, wherein the step of selectively preventing 110 the motion of the intake valve head 31 caused by the second lobe 35 comprises a step of:
  preventing 146 the motion of the intake valve head 31 otherwise caused by the second lobe 35 at every alternate rotation of the at least one camshaft 25, 44 such that the intake opening 31 remains closed during the power stroke, and wherein the step of selectively preventing 122 the motion of the intake valve head 31 caused by the fourth lobe 39 comprises a step of:
  preventing 148 the motion of the intake valve head 31 otherwise caused by the fourth lobe 39 at every rotation of the at least one camshaft 25, 44 such that the intake opening 29 remains closed during the compression stroke and the exhaust stroke. In this manner, the ICE 2 may be operated in an engine running mode, in which the piston 10 drives the at least one camshaft 25, 44, and wherein the gas flow through the ICE 2 is reduced, as discussed above with reference to FIG. 10a. The intake opening 29 is opened during the intake stroke and the exhaust opening 28 is opened during the exhaust stroke. Fuel injected into the combustion chamber 23, or entrained with fresh gases into the combustion chamber 23, combusts e.g. at the start of the power stroke thus, driving the piston 10 and the crankshaft 20.

According to embodiments, in a third engine running mode of the method 100, the step of selectively preventing 108 the motion of the exhaust valve head 30 caused by the first lobe 34 comprises steps of:
  preventing 150 the motion of the exhaust valve head 30 otherwise caused by the first lobe 34 at every alternate rotation of the at least one camshaft 25, 44, such that the exhaust opening 28 remains closed during the compression stroke, wherein the step of selectively preventing 120 the motion of the exhaust valve head 30 caused by the third lobe 38 comprises a step of:
  preventing 152 the motion of the exhaust valve head 30 otherwise caused by the third lobe 38 at every rotation of the at least one camshaft 25, 44, such that the exhaust opening 28 remains closed during the intake stroke and the power stroke, wherein the step of selectively preventing 110 the motion of the intake valve head 31 caused by the second lobe 35 comprises a step of:
  preventing 154 the motion of the intake valve head 31 otherwise caused by the second lobe 35 at every alternate rotation of the at least one camshaft 25, 44 such that the intake opening 31 remains closed during the power stroke, wherein the step of selectively preventing 122 the motion of the intake valve head 31 caused by the fourth lobe 39 comprises a step of:
  preventing 156 the motion of the intake valve head 31 otherwise caused by the fourth lobe 39 at every alternate rotation of the at least one camshaft 25, 44 such that the intake opening 29 remains closed during the compression stroke, and wherein the step of selectively reducing 123 the motion of the intake valve head 31 caused by the fourth lobe 39 comprises a step of:
  reducing 158 the motion of the intake valve head 31 caused by the fourth lobe 39 at every alternate rotation of the at least one camshaft 25, 44, such that the intake opening 29 is partially opened during the exhaust stroke. In this manner, the ICE 2 may be operated in an engine running mode, in which the piston 10 drives the at least one camshaft 25, 44, and wherein the gas flow through the ICE 2 is increased, as discussed above with reference to FIG. 10a. The intake opening 29 is opened during the intake stroke and the exhaust opening 28 is opened during the exhaust stroke. Fuel injected into the combustion chamber 23, or entrained with fresh gases into the combustion chamber 23, combusts e.g. at the start of the power stroke thus, driving the piston 10 and the crankshaft 20.

Now the method 100 will be discussed with reference to FIG. 11b. The steps 102, 104, 106, 108, 109, 110, 111, 116, 118, 121, and 122 from FIG. 11a. are also shown in FIG. 11b.

According to embodiments, wherein the ICE 2 comprises only the first and second lobes 34, 35, in a first engine braking mode of the method 100, the step of selectively preventing 108 the motion of the exhaust valve head 30 may comprise a step of:
   preventing 160 the motion of the exhaust valve head 30, otherwise caused by the first lobe 34 at every rotation or every alternate rotation of the at least one camshaft 25, 44, such that the exhaust opening 28 remains closed during the compression stroke and/or during the exhaust stroke, and either perform a step of selectively reducing 111 the motion of the intake valve head 31 caused by the second lobe 35, comprising a step of:
   reducing 162 the motion of the intake valve head 31 caused by the second lobe 35 at every rotation, such that the intake opening 29 is partially opened during the intake stroke and the power stroke, or performing the steps of selectively preventing 110 the motion of the intake valve head 31 caused by the second lobe 35 and selectively reducing 111 the motion of the intake valve head 31, respectively comprising a step of:
   preventing 164 the motion of the intake valve head 31 caused by the second lobe 35 at every alternate rotation of the at least one camshaft 25, 44, such that the intake opening 29 remains closed during the intake stroke or the power stroke, and
   reducing 166 the motion of the intake valve head 31 caused by the second lobe 35 at every alternate rotation of the at least one camshaft 25, 44, such that the intake opening 29 is partially opened during the other of the intake stroke and the power stroke. In this manner, the ICE 2 may be operated in an engine braking mode, in which the rotational speed of the crankshaft 20 is braked. No fuel is injected into the combustion chamber 23 during the first engine braking mode.

The first engine braking mode may be implemented with various movements of the valve heads 30, 31. Some implementations of the first engine braking mode are schematically shown in the second-fourth graphs of FIG. 6.

According to embodiments of the ICE 2 comprising the third and fourth lobes 38, 39, in a second engine braking mode of the method 100, the step of selectively preventing 108 the motion of the exhaust valve head 30 caused by the first lobe 34 may comprise a step of:
   preventing 168 the motion of the exhaust valve head 30, otherwise caused by the first lobe 34 at every rotation or every alternate rotation of the at least one camshaft 25, 44, such that the exhaust opening 28 remains closed during the compression stroke and/or during the exhaust stroke, wherein the step of selectively reducing 121 the motion of the exhaust valve head 30 caused by the third lobe 38 comprises a step of:
   reducing 170 the motion of the exhaust valve head 30 caused by the third lobe 38 at every rotation or every alternate rotation of the at least one camshaft 25, 44, such that the exhaust opening 28 is partially opened during the intake stroke and/or the power stroke, wherein the step of selectively preventing 110 the motion of the intake valve head 31 caused by the second lobe 35 comprises a step of:
   preventing 172 the motion of the intake valve head 31 otherwise caused by the second lobe 35 at every rotation of the at least one camshaft 25, 44 such that the intake opening 29 remains closed during the compression stroke, and the exhaust stroke, and wherein the step of selectively preventing 122 the motion of the intake valve head 31 caused by the fourth lobe 35 comprises a step of:
   preventing 174 the motion of the intake valve head 31 otherwise caused by the fourth lobe 39 at every rotation of the at least one camshaft 25, 44 such that the intake opening 29 remains closed during the intake stroke, and the power stroke. In this manner, the ICE 2 may be operated in an engine braking mode, in which the rotational speed of the crankshaft 20 is braked. No fuel is injected into the combustion chamber 23 during the second engine braking mode.

The second engine braking mode may be implemented with various movements of the valve heads 30, 31. Two implementations of the second engine braking mode are schematically shown in the first and second graphs of FIG. 10b.

According to embodiments, in a third engine braking mode of the method 100, the step of selectively preventing 108 the motion of the exhaust valve head 30 caused by the first lobe 34, and the step of selectively preventing 122 the motion of the intake valve head 31 caused by the fourth lobe 39, respectively comprise a step of:
   preventing 176 the motion of the exhaust valve head 30, otherwise caused by the first lobe 34 at every alternate rotation of the at least one camshaft 25, 44, and
   preventing 178 the motion of the intake valve head 31 otherwise caused by the fourth lobe 39 at every alternate rotation of the at least one camshaft 25, 44, such that the exhaust opening 28 remains closed during the compression stroke or during the exhaust stroke, wherein the step of selectively reducing 121 the motion of the exhaust valve head 30 caused by the third lobe 38 comprises a step of:
   reducing 180 the motion of the exhaust valve head 30 caused by the third lobe 38 at every rotation or every alternate rotation of the at least one camshaft 25, 44, such that the exhaust opening 28 is partially opened during the intake stroke and/or the power stroke, and wherein the step of selectively preventing 110 the motion of the intake valve head 31 caused by the second lobe 35 comprises a step of:
   prevent 182 the motion of the intake valve head 31 otherwise caused by the second lobe 35 at every rotation of the at least one camshaft 25, 44 such that the intake opening 29 remains closed during the intake stroke, and the power stroke. In this manner, the ICE 2 may be operated in an engine braking mode, in which the rotational speed of the crankshaft 20 is braked. No fuel is injected into the combustion chamber 23 during the third engine braking mode.

The third engine braking mode may be implemented with various movements of the valve heads 30, 31. Two implementations of the third engine braking mode are schematically shown in the third and fourth graphs of FIG. 10b.

One skilled in the art will appreciate that the method 100 for controlling a four-stroke internal combustion engine may be implemented by programmed instructions. These programmed instructions are typically constituted by a computer program, which, when it is executed in a computer or control unit, ensures that the computer or control unit carries out the desired control, such as at least some of the method steps 102-182 according to some embodiments. The computer program is usually part of a computer programme product which comprises a suitable digital storage medium on which the computer program is stored.

Thus, according to a further aspect of the invention there is provided a computer program for performing a method 100 for controlling a four-stroke internal combustion engine, wherein the computer program comprises computer readable code configured to cause one or more calculation units of one or more control units to perform a method 100 according to any one of aspects and/or embodiments discussed herein.

Figure 12:
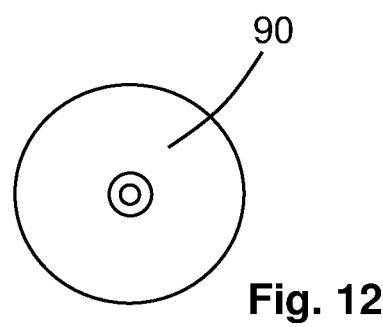
FIG. 12 illustrates a computer program product according to embodiments.

According to a further aspect of the invention there is provided a computer program product 90 for performing a method 100 for controlling a four-stroke internal combustion engine, wherein the computer program product 90 comprises computer readable code configured to cause a one or more calculation units of one or more control units to perform a method 100 according to any one of aspects and/or embodiments discussed herein. FIG. 12 illustrates a computer program product 90 according to embodiments comprising a CD ROM disc 90.

The computer program product 90 may be provided for instance in the form of a data carrier carrying computer program code for performing at least some of the steps 102-182 according to some embodiments when being loaded into the one or more calculation units 73 of the control unit 54, see FIG. 9. The data carrier may be, e.g. a ROM (read-only memory), a PROM (programmable read-only memory), an EPROM (erasable PROM), a flash memory, an EEPROM (electrically erasable PROM), a hard disc, a CD ROM disc, a memory stick, an optical storage device, a magnetic storage device or any other appropriate medium such as a disk or tape that may hold machine readable data in a non-transitory manner. The computer program product may furthermore be provided as computer program code on a server and may be downloaded to the control unit 54 remotely, e.g., over an Internet or an intranet connection, or via other wired or wireless communication systems.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims. The four-stroke ICE may for instance comprise more than one cylinder arrangement. The four-stroke ICE may comprise more than one exhaust valve. The at least one camshaft may comprise one first lobe for each exhaust valve. Each exhaust arrangement may comprise a first linkage arrangement for each exhaust valve. Thus, each first linkage arrangement may be configured to change the motion of each exhaust valve head caused by each of the first lobes. A control unit of the ICE may be configured for controlling each of the first linkage arrangements to selectively prevent the motion of each of the exhaust valve heads, either collectively or for one exhaust valve head at a time. The four-stroke ICE may comprise more than one intake valve. The at least one camshaft may comprise one second lobe for each intake valve. Each intake arrangement may comprise a second linkage arrangement for each intake valve. Thus, each second linkage arrangement may be configured to change the motion of each intake valve head caused by each of the second lobes. A control unit of the ICE may be configured for controlling each of the second linkage arrangements to selectively prevent the motion of each of the intake valve heads, either collectively or for one intake valve head at a time. Similarly, the at least one camshaft may comprise one third lobe for each exhaust valve and one fourth lobe for each intake valve.

The invention claimed is:

1. A four-stroke internal combustion engine comprising:
   a crankshaft;
   at least one cylinder arrangement forming a combustion chamber and comprising a cylinder bore, a piston arranged to reciprocate in the cylinder bore, and a connecting rod connecting the piston to the crankshaft;
   an exhaust arrangement comprising an exhaust valve and an exhaust opening, the exhaust valve comprising an exhaust valve head configured to seal against an exhaust valve seat of the exhaust opening;
   an intake arrangement comprising an intake valve and an intake opening, the intake valve comprising an intake valve head configured to seal against an intake valve seat of the intake opening; and
   at least one camshaft comprising: a first lobe configured to cause a motion of the exhaust valve head, so as to open and close the exhaust opening, via a first linkage arrangement; and a second lobe configured to cause a motion of the intake valve head, so as to open and close the intake opening, via a second linkage arrangement,
   wherein the at least one camshaft is synchronized with the crankshaft to rotate at a same rotational speed as the crankshaft,
   wherein the piston performs a four stroke operation in the cylinder bore, corresponding to an intake stroke, a compression stroke, a power stroke, and an exhaust stroke,
   wherein the first linkage arrangement is configured to change the motion of the exhaust valve head by selectively switching between an activated lift, a partial lift, and a deactivated lift of the exhaust valve head,
   wherein the second linkage arrangement is configured to change the motion of the intake valve head by selectively switching between an activated lift, a partial lift, and a deactivated lift of the intake valve head,
   wherein the partial lift of the exhaust valve head opens the exhaust opening to a lesser degree than the activated lift of the exhaust valve head,
   wherein the partial lift of the intake valve head opens the intake opening to a lesser degree than the activated lift of the intake valve head,
   wherein the first linkage arrangement and the second linkage arrangement are controlled by a control unit, and
   wherein the control unit in a first engine braking mode is configured to switch the first linkage arrangement to the deactivated lift of the exhaust valve head at every rotation or every alternate rotation of the at least one camshaft such that the exhaust opening remains closed during the compression stroke and/or during the exhaust stroke, and either:
      switch the second linkage arrangement to the partial lift of the intake valve head during the intake stroke and the power stroke, or
      switch the second linkage arrangement to the deactivated lift of the intake valve head at every alternate rotation of the at least one camshaft such that the intake opening remains closed during the intake stroke or the power stroke, and to switch to the partial lift of the intake valve head such that the intake opening is partially opened during a remaining one of the intake stroke and the power stroke.

2. The four-stroke internal combustion engine according to claim 1, wherein:
   switching to the partial lift of the exhaust valve head includes reducing an amplitude of the motion of the exhaust valve head; and/or
   switching to the partial lift of the intake valve head includes reducing an amplitude of the motion of the intake valve head.

3. The four-stroke internal combustion engine according to claim 1, wherein:
   switching to the partial lift of the exhaust valve head includes reducing a time of the motion of the exhaust valve head; and/or
   switching to the partial lift of the intake valve head includes reducing a time of the motion of the intake valve head.

4. The four-stroke internal combustion engine according to claim 3, wherein:
   the reducing of the time of the motion of the exhaust valve head includes an early closing of the exhaust valve head; and/or
   the reducing of the time of the motion of the intake valve head includes an early closing of the intake valve head.

5. The four-stroke internal combustion engine according to claim 3, wherein:
   the reducing of the time of the motion of the exhaust valve head includes a late opening of the exhaust valve head; and/or
   the reducing of the time of the motion of the intake valve head includes a late opening of the intake valve head.

6. The four-stroke internal combustion engine according to claim 3, wherein:
   the reducing of the time of the motion of the exhaust valve head includes a late opening and an early closing of the exhaust valve head; and/or
   the reducing of the time of the motion of the intake valve head includes a late opening and an early closing of the intake valve head.

7. The four-stroke internal combustion engine according to claim 1, wherein the control unit in a first engine running mode is configured to:
   switch the first linkage arrangement to the deactivated lift of the exhaust valve head otherwise caused by the first lobe at every alternate rotation of the at least one camshaft such that the exhaust opening remains closed during the compression stroke, and
   switch the second linkage arrangement to the deactivated lift of the intake valve head at every alternate rotation of the at least one camshaft such that the intake opening remains closed during the power stroke.

8. The four-stroke internal combustion engine according to claim 7, wherein the control unit in the first engine running mode is further configured to:
   switch the first linkage arrangement to the deactivated lift of the exhaust valve head at every rotation of the at least one camshaft such that the exhaust opening remains closed during the intake stroke and the power stroke, and
   switch the second linkage arrangement to the deactivated lift of the intake valve head at every rotation of the at least one camshaft such that the intake opening remains closed during the compression stroke and the exhaust stroke.

9. The four-stroke internal combustion engine according to claim 1, wherein the at least one camshaft further comprises:
   a third lobe configured to cause a second motion of the exhaust valve head, so as to open and close the exhaust opening, via the first linkage arrangement; and
   a fourth lobe configured to cause a second motion of the intake valve head, so as to open and close the intake opening, via the second linkage arrangement,
   wherein the first linkage arrangement is further configured to change the second motion of the exhaust valve head by selectively switching between the activated lift, the partial lift, and the deactivated lift of the exhaust valve head, and
   wherein the second linkage arrangement is further configured to change the second motion of the intake valve head by selectively switching between the activated lift, the partial lift, and the deactivated lift of the intake valve head.

10. The four-stroke internal combustion engine according to claim 9, wherein the control unit in a second engine running mode is configured to:
    switch the first linkage arrangement to the deactivated lift of the exhaust valve head at every alternate rotation of the at least one camshaft such that the exhaust opening remains closed during the compression stroke and the power stroke,
    switch the first linkage arrangement to the partial lift of the exhaust valve head at every alternate rotation of the at least one camshaft such that the exhaust opening is partially opened during the intake stroke, and
    switch the second linkage arrangement to the deactivated lift of the intake valve head at every alternate rotation of the at least one camshaft such that the intake opening remains closed during the compression stroke, the power stroke, and the exhaust stroke.

11. The four-stroke internal combustion engine according to claim 9, wherein the control unit in a third engine running mode is configured to:
    switch the first linkage arrangement to the deactivated lift of the exhaust valve head at every alternate rotation of the at least one camshaft such that the exhaust opening remains closed during the intake stroke, the compression stroke, and the power stroke,
    switch the second linkage arrangement to the deactivated lift of the intake valve head at every alternate rotation of the at least one camshaft such that the intake opening remains closed during the compression stroke and the power stroke, and
    switch the second linkage arrangement to the partial lift of the intake valve head at every alternate rotation of the at least one camshaft such that the intake opening is partially opened during the exhaust stroke.

12. The four-stroke internal combustion engine according to claim 9, wherein the control unit in a second engine braking mode is configured to:
    switch the first linkage arrangement to the deactivated lift of the exhaust valve head, at every rotation or every alternate rotation of the at least one camshaft such that the exhaust opening remains closed during the compression stroke and/or during the exhaust stroke,
    switch the first linkage arrangement to the partial lift of the exhaust valve head at every rotation or every alternate rotation of the at least one camshaft such that the exhaust opening is partially opened during the intake stroke and/or the power stroke, and switch the second linkage arrangement to the deactivated lift of the intake valve head at every rotation of the at least one camshaft such that the intake opening remains closed during the four stroke operation.

13. The four-stroke internal combustion engine according to claim 9, wherein the control system in a third engine braking mode is configured to:
    switch the first linkage arrangement to the deactivated lift of the exhaust valve head at every alternate rotation of the at least one camshaft such that the exhaust opening remains closed during the compression stroke or during the exhaust stroke,
    switch the first linkage arrangement to the partial lift of the exhaust valve head at every rotation or every alternate rotation of the at least one camshaft such that the exhaust opening is partially opened during the intake stroke and/or the power stroke, and
    switch the second linkage arrangement to the deactivated lift of the intake valve head at every rotation of the at least one camshaft such that the intake opening remains closed during the intake stroke and the power stroke.

14. A vehicle comprising a four-stroke internal combustion engine according to claim 1.

15. A method for controlling a four-stroke internal combustion engine, the four-stroke internal combustion engine comprising:
    a crankshaft;
    at least one cylinder arrangement forming a combustion chamber and comprising comprises a cylinder bore, a piston arranged to reciprocate in the cylinder bore, and a connecting rod connecting the piston to the crankshaft;
    an exhaust arrangement comprising an exhaust valve and an exhaust opening, the exhaust valve comprising an exhaust valve head configured to seal against an exhaust valve seat of the exhaust opening;
    an intake arrangement comprising an intake valve and an intake opening, the intake valve comprising an intake valve head configured to seal against an intake valve seat of the intake opening; and
    at least one camshaft comprising: a first lobe configured to cause a motion of the exhaust valve head, so as to open and close the exhaust opening, via a first linkage arrangement, and a second lobe configured to cause a motion of the intake valve head, so as to open and close the intake opening, via a second linkage arrangement,
    wherein the piston performs a four stroke operation in the cylinder bore, corresponding to an intake stroke, a compression stroke, a power stroke, and an exhaust stroke, and wherein the method comprising:
    rotating the at least one camshaft at a same rotational speed as the crankshaft;
    changing the motion of the exhaust valve head by selectively switching the first linkage arrangement between an activated lift, a partial lift, and a deactivated lift of the exhaust valve head;
    changing the motion of the intake valve head by selectively switching the second linkage arrangement between an activated lift, a partial lift, and a deactivated lift of the intake valve head;
    wherein the partial lift of the exhaust valve head opens the exhaust opening to a lesser degree than the activated lift of the exhaust valve head;
    wherein the partial lift of the intake valve head opens the intake opening to a lesser degree than the activated lift of the intake valve head; and
    wherein in a first engine braking mode the method further comprises switching the first linkage arrangement to the deactivated lift of the exhaust valve head at every rotation or every alternate rotation of the at least one camshaft such that the exhaust opening remains closed during the compression stroke and/or during the exhaust stroke, and either:
        switching the second linkage arrangement to the partial lift of the intake valve head such that the intake opening is partially opened during the intake stroke and the power stroke; or
        switching the second linkage arrangement to the deactivated lift of the intake valve head at every alternate rotation of the at least one camshaft such that the intake opening remains closed during the intake stroke or the power stroke, and switching to the partial lift of the intake valve head such that the intake opening is partially opened during a remaining one of the intake stroke and the power stroke.

16. The method according to claim 15, wherein the at least one camshaft further comprises a third lobe and a fourth lobe, the method further comprising:
    changing a second motion of the exhaust valve head caused by the third lobe by selectively switching the first linkage arrangement between the activated lift, the partial lift, and the deactivated lift of the exhaust valve head; and
    changing a second motion of the intake valve head caused by the fourth lobe by selectively switching the second linkage arrangement between the activated lift, the partial lift, and the deactivated lift of the intake valve head.

17. The method according to claim 16, wherein in a first engine running mode, the method further comprising:
    preventing a motion switching the first linkage arrangement to the deactivated lift of the exhaust valve head at every alternate rotation of the at least one camshaft such that the exhaust opening remains closed during the intake stroke, the compression stroke, and the power stroke, and:
        switching the second linkage arrangement to the deactivated lift of the intake valve head at every alternate rotation of the at least one camshaft such that the intake opening remains closed during the compression stroke, the power stroke, and the exhaust stroke.

18. The method according to claim 16, wherein in a second engine running mode, the method further comprising:
    switching the first linkage arrangement to the deactivated lift of the exhaust valve head at every alternate rotation of the at least one camshaft, such that the exhaust opening remains closed during the compression stroke and the power stroke,
    switching the first linkage arrangement to the partial lift of the exhaust valve head at every alternate rotation of the at least one camshaft such that the exhaust opening is partially opened during the intake stroke, and
    switching the second linkage arrangement to the deactivated lift of the intake valve head at every alternate rotation of the at least one camshaft such that the intake opening remains closed during the compression stroke, the power stroke, and the exhaust stroke.

19. The method according to claim 16, wherein in a third engine running mode, the method further comprising:
    switching the first linkage arrangement to the deactivated lift of the exhaust valve head at every alternate rotation of the at least one camshaft such that the exhaust opening remains closed during the intake stroke, the compression stroke, and the power stroke, switching the second linkage arrangement to the deactivated lift of the intake valve head at every alternate rotation of the at least one camshaft such that the intake opening remains closed during the compression stroke and the power stroke, and switching the second linkage arrangement to the partial lift of the intake valve head at every alternate rotation of the at least one camshaft such that the intake opening is partially opened during the exhaust stroke.

* * * * *

UNITED STATES PATENT AND TRADEMARK OFFICE
CERTIFICATE OF CORRECTION

| | | |
|---|---|---|
| PATENT NO. | : 10,837,324 B2 | Page 1 of 1 |
| APPLICATION NO. | : 16/498855 | |
| DATED | : November 17, 2020 | |
| INVENTOR(S) | : Dahl et al. | |

It is certified that error appears in the above-identified patent and that said Letters Patent is hereby corrected as shown below:

In the Claims

In Column 31, Claim 7, please change Lines 46 through 49 to read:
"switch the first linkage arrangement to the deactivated lift of the exhaust valve head at every alternate rotation of the at least one camshaft such that the exhaust opening remains closed"

In Column 33, Claim 15, please remove "and wherein" in Line 50

In Column 34, Claim 17, please remove "preventing a motion" in Lines 35 through 36

Signed and Sealed this
Tenth Day of May, 2022

*Katherine Kelly Vidal*

Katherine Kelly Vidal
*Director of the United States Patent and Trademark Office*